(12) United States Patent
    Mi

(10) Patent No.: US 7,633,679 B2
(45) Date of Patent: *Dec. 15, 2009

(54) POLARIZING TURNING FILM

(75) Inventor: Xiang-Dong Mi, Rochester, NY (US)

(73) Assignee: SKC Haas Display Films Co., Ltd., Choonchungnamdo (KR)

( * ) Notice: Subject to any disclaimer, the term of this patent is extended or adjusted under 35 U.S.C. 154(b) by 776 days.

This patent is subject to a terminal disclaimer.

(21) Appl. No.: 11/302,011

(22) Filed: Dec. 13, 2005

(65) Prior Publication Data

US 2007/0132915 A1    Jun. 14, 2007

(51) Int. Cl.
    *G02B 5/30*    (2006.01)
(52) U.S. Cl. .................. 359/487; 359/599; 362/19; 362/355
(58) Field of Classification Search ............ None
    See application file for complete search history.

(56) References Cited

U.S. PATENT DOCUMENTS

| 5,592,332 | A | 1/1997 | Nishio et al. |
| 5,982,540 | A | 11/1999 | Koike et al. |
| 6,027,220 | A | 2/2000 | Arai |
| 6,079,841 | A | 6/2000 | Suzuki |
| 6,111,696 | A | 8/2000 | Allen et al. |
| 6,172,809 | B1 | 1/2001 | Koike et al. |
| 6,280,063 | B1 | 8/2001 | Fong et al. |
| 7,139,125 | B1 | 11/2006 | Mi |
| 2005/0248960 | A1 | 11/2005 | Yamashita et al. |

FOREIGN PATENT DOCUMENTS

| EP | 1 557 700 | 7/2005 |
| WO | 2005/109047 | 11/2005 |
| WO | 2006/071621 | 7/2006 |

*Primary Examiner*—Arnel C Lavarias
(74) *Attorney, Agent, or Firm*—Edwin Oh

(57) ABSTRACT

A light redirecting article redirects light toward a target angle. The light redirecting article is made from a material having a refractive index greater than 1.6. The light redirecting article has an input surface for accepting incident illumination over a range of incident angles and an output surface with a plurality of light redirecting structures, each light redirecting structure having a near surface and an exit surface for emitting an output light at an emitted light angle, wherein the exit surface is at an oblique angle relative to the plane of the input surface. For incident illumination at either of at least two different principal angles, each principal angle being greater than 60 degrees from normal and the principal angles having a difference of 5 degrees or greater, the emitted light angle is within 5 degrees of the target angle.

7 Claims, 18 Drawing Sheets

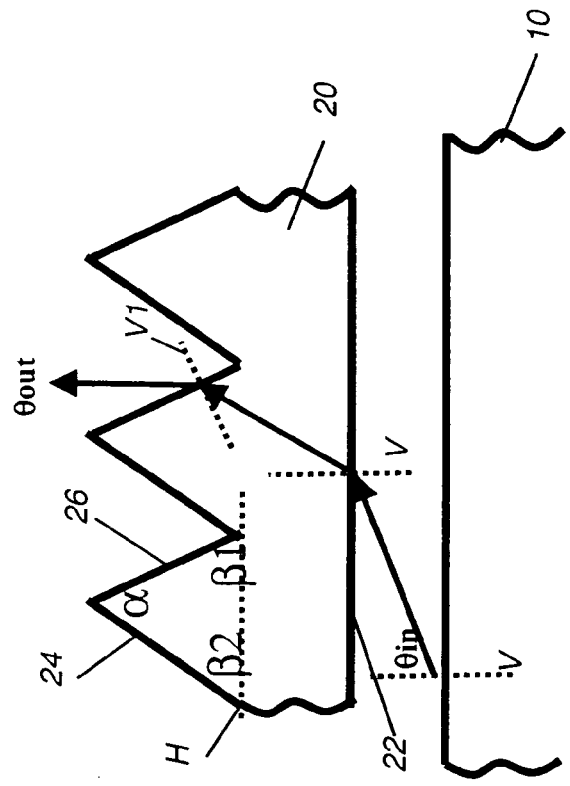
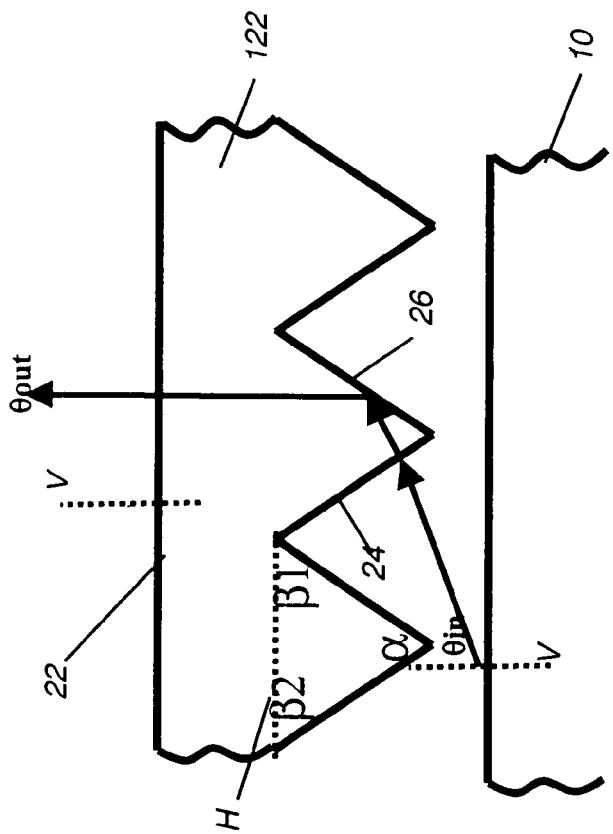
FIG. 2B
FIG. 2A

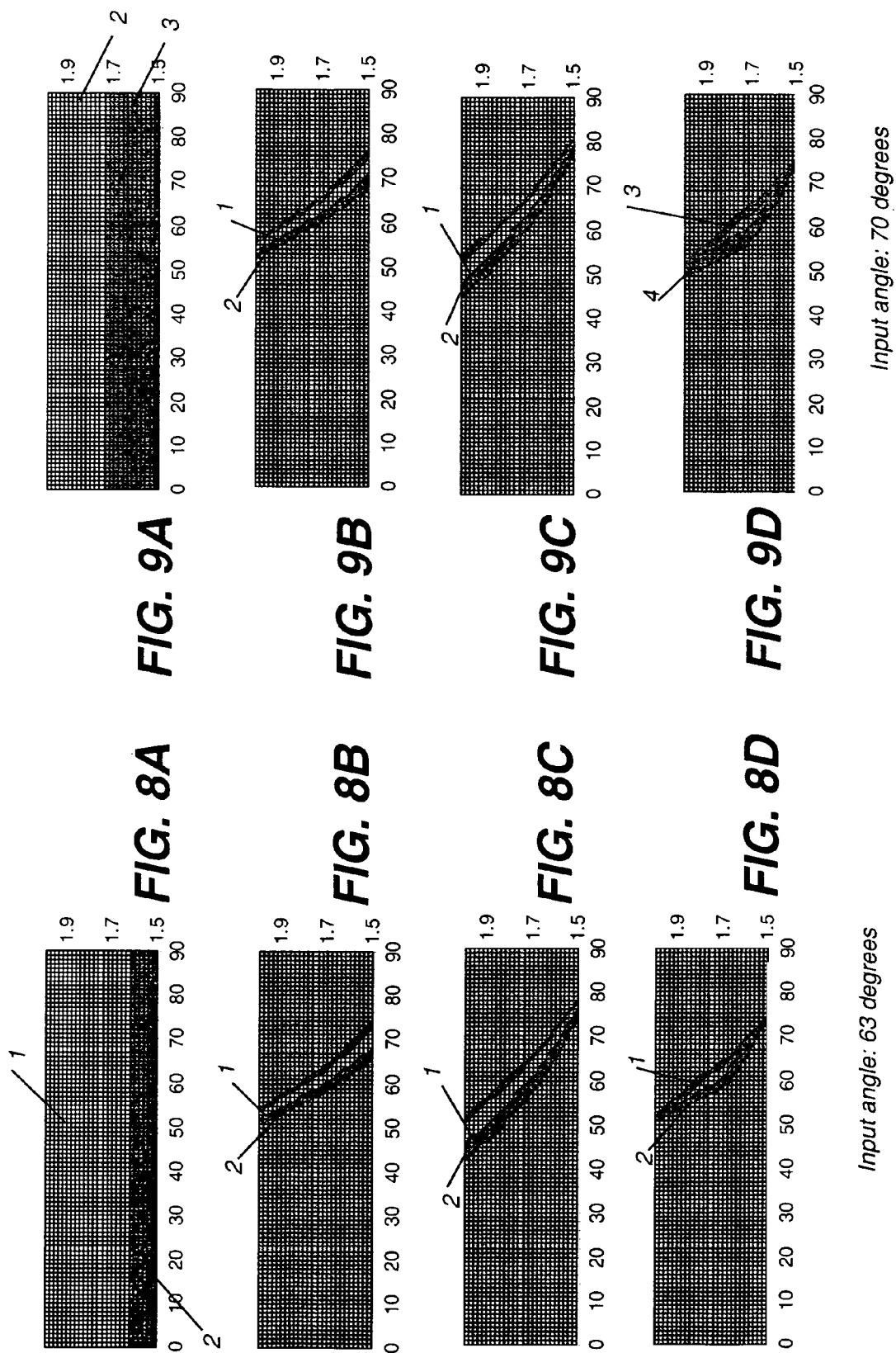

Table 1

| Ex. | $\beta_1$ | $\beta_2$ | n | $\theta_{in}$ | $T_p$ | $T_s$ | $\theta_{out}$ | $\theta_{in}-\theta_b$ | $\theta_4-\theta_b$ | Y |
|---|---|---|---|---|---|---|---|---|---|---|
| 1 Fig.8 | 75.5° | 52.3° | 1.58 | 63° | 95.1% | 72.2% | NA | 5.3 | NA | |
| | | | | 70° | 55.8% | 19.4% | -8.46 | 12.3 | 26.3 | |
| | | | | 75° | 79.7% | 31.5% | -0.12 | 17.3 | 18.0 | Y |
| 2 Fig.9 | 71.1° | 55.7° | 1.58 | 63° | 94.7% | 49.8% | 0.04 | 5.3 | 13.4 | Y |
| | | | | 70° | 95.5% | 50.6% | 7.29 | 12.3 | 6.1 | |
| | | | | 75° | 89.7% | 45.0% | 10.63 | 17.3 | 2.8 | |
| 3.1 | 64.5° | 64.5° | 1.68 | 63° | 99.2% | 52.5% | 0.09 | 3.76 | 5.17 | Y |
| | | | | 70° | 96.7% | 49.4% | 6.03 | 10.76 | -0.76 | |
| | | | | 75° | 90.5% | 42.9% | 8.93 | 15.76 | -3.67 | |
| 3.2 | 66.0° | 66.0° | 1.68 | 63° | 96.6% | 46.6% | -3.84 | 3.76 | 10.60 | Y |
| | | | | 70° | 96.5% | 46.5% | 3.13 | 10.76 | 3.64 | Y |
| | | | | 75° | 90.6% | 41.0% | 6.36 | 15.76 | 0.40 | |
| 3.3 | 67.5° | 67.5° | 1.68 | 63° | 86.0% | 35.3% | -9.63 | 3.76 | 17.89 | |
| | | | | 70° | 94.8% | 42.2% | -0.47 | 10.76 | 8.74 | Y |
| | | | | 75° | 90.2% | 38.3% | 3.31 | 15.76 | 4.96 | Y |
| 3.4 | 69.5° | 69.5° | 1.68 | 63° | 93.4% | 68.5% | NA | 3.76 | NA | |
| | | | | 70° | 83.2% | 30.3% | -7.75 | 10.76 | 18.01 | |
| | | | | 75° | 86.3% | 32.2% | -2.16 | 15.76 | 12.43 | Y |
| 3.5 | 70.0° | 70.0° | 1.68 | 63° | 93.3% | 68.6% | NA | 3.76 | NA | |
| | | | | 70° | 72.2% | 23.8% | -10.84 | 10.76 | 21.60 | |
| | | | | 75° | 83.6% | 29.6% | -4.01 | 15.76 | 14.77 | Y |
| 3.6 | 64.5° | 67.5° | 1.68 | 63° | 99.2% | 52.5% | 0.09 | 3.76 | 5.17 | Y |
| | 67.5° | 64.5° | 1.68 | 70° | 94.8% | 42.2% | -0.47 | 10.76 | 8.74 | Y |
| | 67.5° | 64.5° | 1.68 | 75° | 90.2% | 38.3% | 3.31 | 15.76 | 4.96 | Y |
| 3.7 | 70.5° | 70.5° | 1.68 | 63° | 93.3% | 68.6% | NA | 3.76 | NA | |
| | | | | 70° | 29.4% | 7.6% | -17.02 | 10.76 | 28.28 | |
| | | | | 75° | 79.1% | 26.2% | -6.22 | 15.76 | 17.49 | |
| 3.8 | 61.5° | 61.5° | 1.68 | 63° | 99.6% | 58.8% | 5.76 | 3.76 | -3.50 | |
| | | | | 70° | 95.9% | 52.9% | 10.65 | 10.76 | -8.39 | |
| | | | | 75° | 89.5% | 45.3% | 13.16 | 15.76 | -10.90 | |

FIG. 11

Table 2

| Ex. | $\beta_1$ | $\beta_2$ | n | $\theta_{in}$ | $T_p$ | $T_s$ | $\theta_{out}$ | $\theta_{in}-\theta_b$ | $\theta_4-\theta_b$ | Y |
|---|---|---|---|---|---|---|---|---|---|---|
| 4.1 | 59.0° | 60.0° | 1.78 | 63° | 99.9% | 52.1% | -0.54 | 2.33 | -1.14 | Y |
|  |  |  |  | 70° | 96.7% | 47.4% | 4.72 | 9.33 | -6.40 | Y |
|  |  |  |  | 75° | 90.5% | 40.6% | 7.36 | 14.33 | -9.04 |  |
|  |  |  |  |  |  |  |  |  |  |  |
| 4.2 | 60.0° | 60.0° | 1.78 | 63° | 99.8% | 49.7% | -2.75 | 2.33 | 2.07 | Y |
|  |  |  |  | 70° | 97.1% | 46.0% | 2.93 | 9.33 | -3.60 | Y |
|  |  |  |  | 75° | 90.9% | 39.6% | 5.72 | 14.33 | -6.40 |  |
|  |  |  |  |  |  |  |  |  |  |  |
| 4.3 | 60.5° | 60.5° | 1.78 | 63° | 99.5% | 48.1% | -3.98 | 2.33 | 3.80 | Y |
|  |  |  |  | 70° | 97.2% | 45.2% | 1.96 | 9.33 | -2.13 | Y |
|  |  |  |  | 75° | 91.1% | 39.1% | 4.85 | 14.33 | -5.02 |  |
|  |  |  |  |  |  |  |  |  |  |  |
| 4.4 | 62.0° | 62.0° | 1.78 | 63° | 96.8% | 41.8% | -8.44 | 2.33 | 9.76 |  |
|  |  |  |  | 70° | 97.1% | 42.1% | -1.33 | 9.33 | 2.66 | Y |
|  |  |  |  | 75° | 91.5% | 37.0% | 1.93 | 14.33 | -0.60 | Y |
|  |  |  |  |  |  |  |  |  |  |  |
| 4.5 | 60.0° | 62.0° | 1.78 | 63° | 99.8% | 49.7% | -2.75 | 2.33 | 2.07 | Y |
|  | 60.0° | 62.0° | 1.78 | 70° | 97.1% | 46.0% | 2.93 | 9.33 | -3.60 | Y |
|  | 62.0° | 60.0° | 1.78 | 70° | 97.1% | 42.1% | -1.33 | 9.33 | 2.66 | Y |
|  | 62.0° | 60.0° | 1.78 | 75° | 91.5% | 37.0% | 1.93 | 14.33 | -0.60 | Y |
|  |  |  |  |  |  |  |  |  |  |  |
| 4.6 | 65.0° | 65.0° | 1.78 | 63° | 94.1% | 63.1% | NA | 2.33 | NA |  |
|  |  |  |  | 70° | 85.9% | 28.0% | -11.65 | 9.33 | 15.98 |  |
|  |  |  |  | 75° | 88.1% | 29.2% | -6.23 | 14.33 | 10.56 |  |
|  |  |  |  |  |  |  |  |  |  |  |
| 4.7 | 55.5° | 60.0° | 1.78 | 63° | 98.5% | 57.4% | 5.57 | 2.33 | -10.74 |  |
|  |  |  |  | 70° | 95.0% | 50.6% | 9.97 | 9.33 | -15.14 |  |
|  |  |  |  | 75° | 88.9% | 42.8% | 12.26 | 14.33 | -17.43 |  |

FIG. 12

Table 3

| Ex. | $\beta_1$ | $\beta_2$ | n | $\theta_{in}$ | $T_p$ | $T_s$ | $\theta_{out}$ | $\theta_{in}-\theta_b$ | $\theta_4-\theta_b$ | Y |
|---|---|---|---|---|---|---|---|---|---|---|
| 5.1 | 55.0° | 61.7° | 1.88 | 63° | 99.6% | 49.5% | -2.67 | 1.01 | -4.32 | Y |
|  |  |  |  | 70° | 96.5% | 44.4% | 2.36 | 8.01 | -9.35 | Y |
|  |  |  |  | 75° | 90.6% | 37.8% | 4.90 | 13.01 | -11.89 | Y |
| 5.2 | 55.5° | 61.7° | 1.88 | 63° | 99.8% | 48.4% | -3.77 | 1.01 | -2.72 | Y |
|  |  |  |  | 70° | 96.8% | 43.8% | 1.44 | 8.01 | -7.93 | Y |
|  |  |  |  | 75° | 90.9% | 37.3% | 4.05 | 13.01 | -10.54 | Y |
| 5.3 | 56.0° | 61.7° | 1.88 | 63° | 100.0% | 47.3% | -4.95 | 1.01 | -1.04 | Y |
|  |  |  |  | 70° | 97.1% | 43.1% | 0.47 | 8.01 | -6.46 | Y |
|  |  |  |  | 75° | 91.2% | 36.8% | 3.16 | 13.01 | -9.15 | Y |
| 5.4 | 60.0° | 61.7° | 1.88 | 63° | 75.6% | 21.6% | -21.17 | 1.01 | 19.18 |  |
|  |  |  |  | 70° | 95.6% | 32.8% | -10.10 | 8.01 | 8.11 |  |
|  |  |  |  | 75° | 92.0% | 30.3% | -6.04 | 13.01 | 4.05 |  |
| 5.5 | 50.5° | 61.7° | 1.88 | 63° | 96.9% | 55.4% | 5.21 | 1.01 | -16.70 |  |
|  |  |  |  | 70° | 93.8% | 48.1% | 9.30 | 8.01 | -20.79 |  |
|  |  |  |  | 75° | 88.1% | 40.4% | 11.44 | 13.01 | -22.93 |  |

FIG. 13

Table 4

| Ex. | $\beta_1$ | $\beta_2$ | n | $\theta_{in}$ | $T_p$ | $T_s$ | $\theta_{out}$ | $\theta_{in}-\theta_b$ | $\theta_4-\theta_b$ | Y |
|---|---|---|---|---|---|---|---|---|---|---|
| 6.1 | 50.5° | 63.3° | 1.98 | 63° | 98.3% | 48.7% | -2.40 | -0.20 | -10.30 | Y |
|  |  |  |  | 70° | 95.3% | 42.8% | 2.16 | 6.80 | -14.87 | Y |
|  |  |  |  | 75° | 89.8% | 36.0% | 4.51 | 11.80 | -17.21 | Y |
| 6.2 | 51.5° | 63.3° | 1.98 | 63° | 99.0% | 47.1% | -4.51 | -0.20 | -7.19 | Y |
|  |  |  |  | 70° | 96.1% | 41.8% | 0.33 | 6.80 | -12.04 | Y |
|  |  |  |  | 75° | 90.5% | 35.3% | 2.79 | 11.80 | -14.50 | Y |
| 6.3 | 55.5° | 63.3° | 1.98 | 63° | 96.6% | 33.0% | -16.78 | -0.20 | 9.07 |  |
|  |  |  |  | 70° | 98.2% | 34.5% | -9.20 | 6.80 | 1.49 |  |
|  |  |  |  | 75° | 93.2% | 30.4% | -5.82 | 11.80 | -1.88 |  |
| 6.4 | 46.0° | 63.3° | 1.98 | 63° | 94.8% | 53.4% | 5.23 | -0.20 | -22.44 |  |
|  |  |  |  | 70° | 92.2% | 45.9% | 9.07 | 6.80 | -26.27 |  |
|  |  |  |  | 75° | 87.0% | 38.2% | 11.09 | 11.80 | -28.29 |  |

FIG. 14

Table 5

| Ex. | $\beta_1$ | $\beta_2$ | n | $\theta_{in}$ | $T_p$ | $T_s$ | $\theta_{out}$ | $\theta_{in}-\theta_b$ | $\theta_4-\theta_b$ | Y |
|---|---|---|---|---|---|---|---|---|---|---|
| 7.1 | $37.0^0$ | $68.0^0$ | 2.38 | $63^0$ | 89.3% | 43.0% | -1.07 | -4.21 | -29.14 | |
| | | | | $70^0$ | 88.3% | 36.3% | 2.56 | 2.79 | -32.77 | |
| | | | | $75^0$ | 84.7% | 29.7% | 4.48 | 7.79 | -34.69 | |
| 7.2 | $38.5^0$ | $68.0^0$ | 2.38 | $63^0$ | 90.9% | 41.8% | -4.07 | -4.21 | -24.64 | |
| | | | | $70^0$ | 89.7% | 35.4% | -0.24 | 2.79 | -28.47 | |
| | | | | $75^0$ | 85.9% | 29.1% | 1.76 | 7.79 | -30.47 | |
| 7.3 | $42.0^0$ | $68.0^0$ | 2.38 | $63^0$ | 95.8% | 37.0% | -12.55 | -4.21 | -12.66 | |
| | | | | $70^0$ | 94.1% | 32.4% | -7.89 | 2.79 | -17.32 | |
| | | | | $75^0$ | 89.9% | 26.9% | -5.53 | 7.79 | -19.68 | |
| 7.4 | $33.5^0$ | $68.0^0$ | 2.38 | $63^0$ | 86.4% | 45.0% | 5.14 | -4.21 | -38.84 | |
| | | | | $70^0$ | 85.8% | 37.6% | 8.46 | 2.79 | -42.17 | |
| | | | | $75^0$ | 82.4% | 30.7% | 10.23 | 7.79 | -43.94 | |

FIG. 15

Table 6

| Ex. | $\beta_1$ | $\beta_2$ | n | $\theta_{in}$ | $T_p$ | $T_s$ | $\theta_{out}$ | $\theta_{in}-\theta_b$ | $\theta_7-\theta_b$ | Y |
|---|---|---|---|---|---|---|---|---|---|---|
| 3.2 B | $90^0$ | $66.0^0$ | 1.68 | $63^0$ | 96.6% | 46.6% | 3.84 | 3.76 | 10.60 | Y |
| | | | | $70^0$ | 96.5% | 46.5% | -3.13 | 10.76 | 3.64 | Y |
| | | | | $75^0$ | 90.6% | 41.0% | -6.36 | 15.76 | 0.40 | |
| 3.7 B | $90^0$ | $70.5^0$ | 1.68 | $63^0$ | 93.3% | 68.6% | NA | 3.76 | NA | |
| | | | | $70^0$ | 29.4% | 7.6% | 17.02 | 10.76 | 28.28 | |
| | | | | $75^0$ | 79.1% | 26.2% | 6.22 | 15.76 | 17.49 | |
| 3.8 B | $90^0$ | $61.5^0$ | 1.68 | $63^0$ | 99.6% | 58.8% | -5.76 | 3.76 | -3.50 | |
| | | | | $70^0$ | 95.9% | 52.9% | -10.65 | 10.76 | -8.39 | |
| | | | | $75^0$ | 89.5% | 45.3% | -13.16 | 15.76 | -10.90 | |
| 4.3 B | $90^0$ | $60.5^0$ | 1.78 | $63^0$ | 99.5% | 48.1% | 3.98 | 2.33 | 3.80 | Y |
| | | | | $70^0$ | 97.2% | 45.2% | -1.96 | 9.33 | -2.13 | Y |
| | | | | $75^0$ | 91.1% | 39.1% | -4.85 | 14.33 | -5.02 | Y |

FIG. 16

Table 7

| Ex. | $\beta_1$ | $\beta_2$ | n | $\theta_{in}$ | $T_p$ | $T_s$ | $\theta_{out}$ | $\theta_{in}-\theta_b$ | $\theta_7-\theta_b$ | Y |
|---|---|---|---|---|---|---|---|---|---|---|
| 8.1 | $89^0$ | $70.5^0$ | 1.68 | $63^0$ | 35.8% | 10.6% | 16.47 | 3.76 | 27.73 | |
| | | | | $70^0$ | 91.7% | 37.7% | 1.55 | 10.76 | 12.81 | Y |
| | | | | $75^0$ | 89.0% | 35.8% | -2.85 | 15.76 | 8.41 | Y |
| | | | | | | | | | | |
| 8.2 | $89^0$ | $68.5^0$ | 1.68 | $63^0$ | 94.6% | 43.8% | 3.46 | 3.76 | 12.72 | Y |
| | | | | $70^0$ | 96.2% | 45.3% | -4.02 | 10.76 | 5.24 | Y |
| | | | | $75^0$ | 90.6% | 40.2% | -7.41 | 15.76 | 1.85 | |
| | | | | | | | | | | |
| 8.3 | $89^0$ | $63.5^0$ | 1.78 | $63^0$ | 98.2% | 44.3% | 4.79 | 2.33 | 7.62 | Y |
| | | | | $70^0$ | 97.3% | 43.2% | -1.84 | 9.33 | 0.99 | Y |
| | | | | $75^0$ | 91.4% | 37.8% | -4.96 | 14.33 | -2.13 | Y |

FIG. 17

Table 8

| Ex. | $\beta_1$ | $\beta_2$ | n | $\theta_{in}$ | $T_p$ | $T_s$ | $\theta_{out}$ | $\theta_{in}-\theta_b$ | $\theta_7-\theta_b$ | Y |
|---|---|---|---|---|---|---|---|---|---|---|
| 9.1 | $85^0$ | $68.5^0$ | 1.88 | $63^0$ | 97.0% | 37.5% | 2.58 | 1.01 | 9.09 | Y |
| | | | | $70^0$ | 97.7% | 38.2% | -4.69 | 8.01 | 1.82 | Y |
| | | | | $75^0$ | 92.3% | 33.6% | -7.98 | 13.01 | -1.47 | |
| | | | | | | | | | | |
| 9.2 | $85^0$ | $70.0^0$ | 1.88 | $63^0$ | 75.6% | 21.6% | 11.17 | 1.01 | 19.18 | |
| | | | | $70^0$ | 95.6% | 32.8% | 0.10 | 8.01 | 8.11 | Y |
| | | | | $75^0$ | 92.0% | 30.3% | -3.96 | 13.01 | 4.05 | Y |
| | | | | | | | | | | |
| 9.3 | $85^0$ | $72.5^0$ | 1.88 | $63^0$ | 92.2% | 60.1% | NA | 1.01 | NA | |
| | | | | $70^0$ | 89.8% | 51.4% | NA | 8.01 | NA | |
| | | | | $75^0$ | 74.2% | 16.9% | 7.44 | 13.01 | 17.95 | |
| | | | | | | | | | | |
| 9.4 | $85^0$ | $66.0^0$ | 1.88 | $63^0$ | 100.0% | 47.3% | -5.05 | 1.01 | -1.04 | |
| | | | | $70^0$ | 97.1% | 43.1% | -10.47 | 8.01 | -6.46 | |
| | | | | $75^0$ | 91.2% | 36.8% | -13.16 | 13.01 | -9.15 | |
| | | | | | | | | | | |
| 9.5 | $88.5^0$ | $62.0^0$ | 1.88 | $63^0$ | 94.2% | 34.0% | 11.76 | 1.01 | 11.77 | |
| | | | | $70^0$ | 97.4% | 36.7% | 3.75 | 8.01 | 3.76 | Y |
| | | | | $75^0$ | 92.4% | 32.6% | 0.25 | 13.01 | 0.26 | Y |

FIG. 18

Table 9

| Ex. | $\beta_1$ | $\beta_2$ | n | $\theta_{in}$ | $T_p$ | $T_s$ | $\theta_{out}$ | $\theta_{in}-\theta_b$ | $\theta_7-\theta_b$ | Y |
|---|---|---|---|---|---|---|---|---|---|---|
| 10.1 | 85.5° | 63.3° | 1.98 | 63° | 99.7% | 39.6% | 2.90 | -0.20 | 2.95 | Y |
| | | | | 70° | 98.1% | 37.6% | -3.31 | 6.80 | -3.25 | Y |
| | | | | 75° | 92.5% | 32.4% | -6.27 | 11.80 | -6.21 | |
| | | | | | | | | | | |
| 10.2 | 86° | 63.3° | 1.98 | 63° | 97.7% | 34.6% | 7.68 | -0.20 | 7.73 | |
| | | | | 70° | 98.3% | 35.2% | 0.45 | 6.80 | 0.50 | Y |
| | | | | 75° | 93.1% | 30.8% | -2.83 | 11.80 | -2.77 | Y |
| | | | | | | | | | | |
| 10.3 | 87° | 63.3° | 1.98 | 63° | 89.2% | 58.0% | NA | -0.20 | NA | |
| | | | | 70° | 93.9% | 26.8% | 10.00 | 6.80 | 10.05 | |
| | | | | 75° | 92.3% | 25.9% | 5.38 | 11.80 | 5.43 | |
| | | | | | | | | | | |
| 10.4 | 84° | 63.3° | 1.98 | 63° | 98.8% | 47.5% | -8.02 | -0.20 | -7.97 | |
| | | | | 70° | 95.9% | 42.1% | -12.79 | 6.80 | -12.74 | |
| | | | | 75° | 90.3% | 35.5% | -15.22 | 11.80 | -15.17 | |

FIG. 19

POLARIZING TURNING FILM

FIELD OF THE INVENTION

This invention generally relates to display illumination articles for enhancing luminance from a surface and more particularly relates to a turning film that redirects light from a light guiding plate and provides polarized light output.

BACKGROUND OF THE INVENTION

Liquid crystal displays (LCDs) continue to improve in cost and performance, becoming a preferred display type for many computer, instrumentation, and entertainment applications. The transmissive LCD used in conventional laptop computer displays is a type of backlit display, having a light providing surface positioned behind the LCD for directing light outwards, towards the LCD. The challenge of providing a suitable backlight apparatus having brightness that is sufficiently uniform while remaining compact and low cost has been addressed following one of two basic approaches. In the first approach, a light-providing surface is used to provide a highly scattered, essentially Lambertian light distribution, having an essentially constant luminance over a broad range of angles. Following this first approach, with the goal of increasing on-axis and near-axis luminance, a number of brightness enhancement films have been proposed for redirecting a portion of this light having Lambertian distribution in order to provide a more collimated illumination. Among proposed solutions for brightness enhancement films are those described in U.S. Pat. No. 5,592,332 (Nishio et al.); U.S. Pat. No. 6,111,696 (Allen et al); and U.S. Pat. No. 6,280,063 (Fong et al.), for example. Solutions such as the brightness enhancement film (BEF) described in patents cited above provide some measure of increased brightness over wide viewing angles. However, overall contrast, even with a BEF, remains relatively poor.

A second approach to providing backlight illumination employs a light guiding plate (LGP) that accepts incident light from a lamp or other light source disposed at the side and guides this light internally using Total Internal Reflection (TIR) so that light is emitted from the LGP over a narrow range of angles. The output light from the LGP is typically at a fairly steep angle with respect to normal, such as 70 degrees or more. With this second approach, a turning film, one type of light redirecting article, is then used to redirect the emitted light output from the LGP toward normal. Directional turning films, broadly termed light-redirecting articles or light-redirecting films, such as that provided with the HSOT (Highly Scattering Optical Transmission) light guide panel available from Clarex, Inc., Baldwin, N.Y., provide an improved solution for providing a uniform backlight of this type, without the need for diffusion films or for dot printing in manufacture. HSOT light guide panels and other types of directional turning films use arrays of prism structures, in various combinations, to redirect light from a light guiding plate toward normal, or toward some other suitable target angle that is typically near normal relative to the two-dimensional surface. As one example, U.S. Pat. No. 6,746,130 (Ohkawa) describes a light control sheet that acts as a turning film for LGP illumination.

Referring to FIG. 1, the overall function of a light guiding plate 10 in a display apparatus 100 is shown. Light from a light source 12 is incident at an input surface 18 and passes into light guiding plate 10, which is typically wedge-shaped as shown. The light propagates within light guiding plate 10 until Total Internal Reflection (TIR) conditions are frustrated and then, possibly reflected from a reflective surface 142, exits light guiding plate at an output surface 16. This light then goes to a turning film 122 and is directed to illuminate a light-gating device 120 such as an LCD or other type of spatial light modulator or other two-dimensional backlit component that modulates the light. For optimized viewing under most conditions, the emitted light should be provided over a range of relatively narrow angles about a normal N. A polarizer 124 is necessarily disposed in the illumination path in order to provide light-gating device 120 with suitably polarized light for modulation. However, since light after passing through turning film 122 is essentially unpolarized, or has at most some small degree of polarization, the polarizer 124 must absorb about half of the light. In order to overcome this problem, a reflective polarizer 125 is often provided between absorptive polarizer 124 and turning film 122.

One type of reflective polarizer is disclosed in U.S. Pat. Nos. 5,982,540 and 6,172,809 entitled "Surface light source device with polarization function" to Koike et al. The Koike et al. '540 and '809 disclosures show a surface light source device that has a light guiding plate, one or more polarization separating plates, a light direction modifier (essentially a turning film), and a polarization converter. The polarization separating plate is a type of reflective polarizer 125. The polarization separating plate described in the Koike et al. '540 disclosure utilizes Brewster's angle for separating S- and P-polarized components of the illumination. While this approach provides some polarization of the light, however, it merely provides one type of substitute for more conventional reflective polarizing films. This solution still requires the additional use of separate polarizer film or film(s). Moreover, the approach of the Koike et al. '540 and '809 disclosures requires that the index of refraction n of the material used for the polarization separating plate be within a narrow range, based on the incident angle of light from the light guiding plate.

Clearly, there would be advantages to reducing the overall number of components needed to provide polarized illumination without compromising image quality and performance. With this goal in mind, there have been a number of solutions proposed for simplifying the structure of polarizer 125 or eliminating this component as a separate unit by combining functions. In an attempt to combine functions, U.S. Pat. No. 6,027,220 entitled "Surface Light Source Device Outputting Polarized Frontal Illumination Light" to Arai discloses a surface light source device capable of producing illumination that is at least partially polarized. As the Arai '220 disclosure shows, there is inherently some polarization of light that emerges from light guiding plate 10 (FIG. 1). In addition, there is further polarization of this light inherently performed by the turning film. In a configuration that employs a pair of turning films, there can be even further slight gains in polarization. Following the approach of the Arai '220 disclosure, a surface light source can be designed that provides some degree of polarization simply by using suitable materials for each turning film and matching these materials, according to their index of refraction n, to the angle of inclination of light from the light guiding plate. While this approach has merit for providing some measure of polarization, however, there are practical limits to how much improvement can be gained based on simply specifying an index of refraction n. Moreover, embodiments utilizing multiple turning films add cost, thickness, and complexity to the illumination system design.

In yet another approach, U.S. Pat. No. 6,079,841 entitled "Apparatus for Increasing a Polarization Component, Light Guide Unit, Liquid Crystal Display and Polarization Method" to Suzuki, provides a light guiding plate that is itself designed to deliver polarized light. The Suzuki '841 light guiding plate utilizes a stack of light guides laminated together and oriented to provide Brewster's angle conditioning of the light to achieve a preferred polarization state. While this method has the advantage of incorporating polarization components within the light guide itself, there are disadvantages to this type of approach. The complexity of the light guide plate and the added requirement for a half-wave or quarter-wave plate and reflector negates the advantage gained by eliminating the polarizer as a separate component in the illumination path.

Thus, it can be seen that, while there have been attempts to provide polarized illumination by incorporating the polarization function with other components, these attempts have not provided flexible, less costly, and more effective solutions. There is, then, a need for a low cost turning film solution that provides polarized illumination with a reduced number of components.

SUMMARY OF THE INVENTION

The present invention provides a light redirecting article for redirecting light toward a target angle, the light redirecting article comprising a material having a refractive index greater than 1.6, said light redirecting article further comprising:

(a) an input surface for accepting incident illumination over a range of incident angles;

(b) an output surface comprising a plurality of light redirecting structures each light redirecting structure having a near surface and an exit surface for emitting an output light at an emitted light angle, wherein the exit surface is at an oblique angle relative to the plane of the input surface, whereby for incident illumination at either of at least two different principal angles, each principal angle being greater than 60 degrees from normal and said principal angles having a difference of 5 degrees or greater, the emitted light angle is within 5 degrees of the target angle.

This invention further provides a display apparatus comprising:

(a) an illumination source for emitting illumination over a range of angles;

(b) a light redirecting article for redirecting light toward a target angle, the light redirecting article comprising a material having a refractive index greater than 1.6, said light redirecting article further comprising:

(i) an input surface for accepting incident illumination over a range of incident angles;

(ii) an output surface comprising a plurality of light redirecting structures each light redirecting structure having a near surface and an exit surface for emitting an output light at an emitted light angle, wherein the exit surface is at an oblique angle relative to the plane of the input surface, whereby for incident illumination at either of at least two different principal angles, each principal angle being greater than 60 degrees from normal and said principal angles having a difference of 5 degrees or greater, the emitted light angle is within 5 degrees of the target angle; and (c) a light gating device for forming an image by modulating the output light from the light redirecting article.

It is an advantage of the present invention that it provides a single component that combines turning film and polarizer functions for illumination that is incident over a range of principal angles.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 2A is a schematic cross-sectional view showing a turning film with prismatic structure facing downward, toward the light guiding plate;

FIG. 2B is a schematic cross-sectional view showing a turning film with prismatic structure facing upward;

FIG. 8B is a contour plot showing a parameter space of far base angle and index of refraction for satisfying $|\theta_4-\theta_b|<5°$ and $|\theta_4-\theta_b|<10°$ for input angle $\theta_{in}=63°$;

FIG. 8C is a contour plot showing a parameter space of far base angle and index of refraction for satisfying $|\theta_{out}|<5°$ and $|\theta_{out}|<10°$ for input angle $\theta_{in}=63°$;

FIG. 8D is a contour plot showing a parameter space of far base angle and index of refraction for satisfying $|\theta_{in}-\theta_b|<5°$, $|\theta_4-\theta_b|<5°$, and $|\theta_{out}|<5°$, and $|\theta_{in}-\theta_b|<10°$, $|\theta_4-\theta_b|<10°$, $|\theta_{out}|<10°$ for input angle $\theta_{in}=63°$;

FIG. 9A is a contour plot showing a parameter space of far base angle and index of refraction for satisfying $|\theta_{in}-\theta_b|<10°$ and $|\theta_{in}-\theta_b|<15°$ for input angle $\theta_{in}=70°$;

FIG. 9B is a contour plot showing a parameter space of far base angle and index of refraction for satisfying $|\theta_4-\theta_b|<5°$ and $|\theta_4-\theta_b|<10°$ for input angle $\theta_{in}=70°$;

FIG. 9C is a contour plot showing a parameter space of far base angle and index of refraction for satisfying $|\theta_{out}|<5°$ and $|\theta_{out}|<10°$ for input angle $\theta_{in}=70°$;

FIG. 9D is a contour plot showing a parameter space of far base angle and index of refraction for satisfying $|\theta_{in}-\theta_b|<10°$, $|\theta_4-\theta_b|<5°$, and $|\theta_{out}|<5°$, and $|\theta_{in}-\theta_b|<15°$, $|\theta_4-\theta_b|<10°$, $|\theta_{out}|<10°$ for input angle $\theta_{IN}=70°$;

FIGS. 11-19 are tables giving example data on embodiments having various indices of refraction and geometries; and, FIGS. 20A and 20B are perspective views showing a turning film usable in either of two positions, according to one embodiment.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

As was noted in the background section above, there have been attempts to reduce the overall complexity of illumination apparatus by incorporating the polarization function within other components in the illumination path. The approach of the present invention is to incorporate the polarization function within the turning film, or more broadly, within the light redirecting element of the display. Unlike conventional approaches described hereinabove, the method of the present invention employs Brewster's angle in the design of the light redirecting article's geometry and composition, thereby performing both light redirection and polarization in a single component.

The apparatus of the present invention uses light-redirecting structures that are generally shaped as prisms. True prisms have at least two planar faces. Because, however, one or more surfaces of the light-redirecting structures need not be planar in all embodiments, but may be curved or have multiple sections, the more general term "light redirecting structure" is used in this specification.

As noted in the background material given earlier, the conventional turning film redirects light received at an oblique angle of incidence, typically 60 degrees or more from normal, from a light guiding plate or a similar light-providing component. The turning film typically employs an array of refractive structures, typically prism-shaped and of various dimensions, to redirect light from the light guiding plate toward normal. Because these are provided as films, normal is considered relative to the two-dimensional plane of the film.

Figure 1:
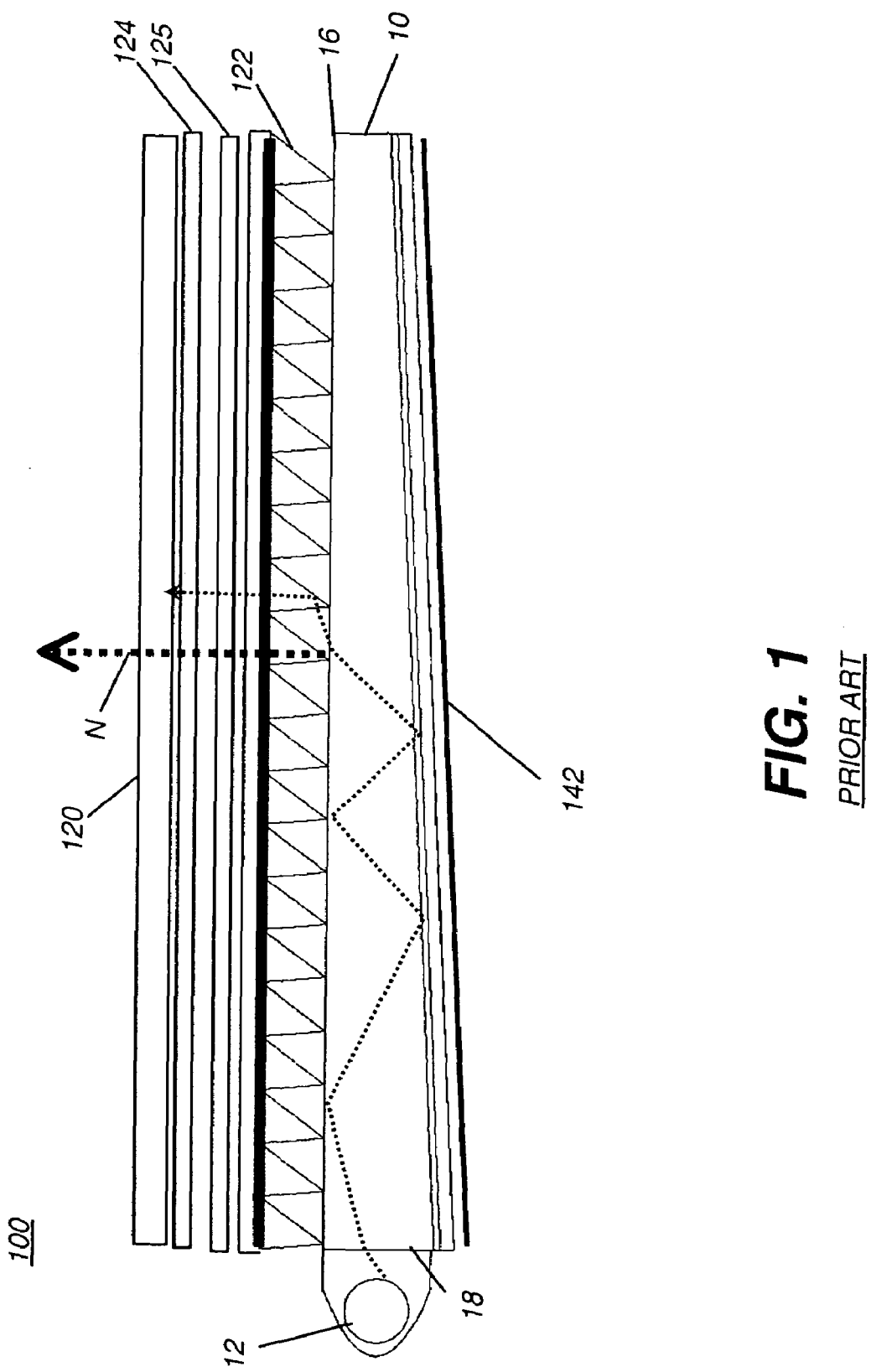
FIG. 1 is a cross sectional view showing components of a conventional display apparatus.

As was shown with reference to FIG. 1, light source 12 is placed at the side of light guiding plate 10. This positioning and the design of light guiding plate 10 dictate the needed angular behavior and design layout of turning films. For a range of light guiding plate 10 performance conditions, the light redirecting article of the present invention can be used to replace conventional turning film 122 in the FIG. 1 arrangement and can provide sufficient polarization to eliminate, or at least minimize the performance requirements of, either or both polarizer 124 and reflective polarizer 125.

Referring to FIG. 2A, there is shown a schematic cross-sectional view of conventional turning film 122 used with light guiding plate 10, showing key angles and geometric relationships. Turning film 122 has a number of prismatic structures facing downward toward light guiding plate 10, each structure having a near surface 24 (being near relative to light source 12, as shown in the embodiment of FIG. 1) and a far surface 26, both sides slanted from a film normal direction V as determined by an apex angle α, and base angles β1 and β2, relative to a horizontal H. Light from light guiding plate 10 is incident over a small range of angles about a central input angle $\theta_{in}$. The output angle $\theta_{out}$ of light delivered to the LC display element at a flat surface 22 of turning film 122 is determined by a number of factors including the central input angle $\theta_{in}$, the refractive index n of turning film 122, and the base angle β1 at which far surface 26 is slanted. Output angle $\theta_{out}$ for emitted light is preferably normal with respect to turning film 122, however output angle $\theta_{out}$ can be considered a target angle, which may be at some inclination with respect to normal for some applications. Generally the target angle is plus or minus 20° from normal.

FIG. 2B shows a different arrangement of a turning film 20 in which prismatic structures face upwards, toward the LC device or other light modulator. Flat surface 22 is now the input surface; the structured surface is the output surface. In this configuration, the basic pattern used for the present invention, each light redirecting structure on the output surface again has near surface 24 (being near relative to light source 12, as shown in the embodiment of FIG. 1) and far surface 26, both sides obliquely slanted from a film normal direction V as determined by apex angle α, and base angles β1 and β2, relative to a reference line labeled H that is parallel to the plane of the input surface and has a horizontal orientation in the view of FIGS. 2A, 2B, and following. Light from light guiding plate 10 is incident over a small range of angles about central input principal angle $\theta_{in}$. The output angle $\theta_{out}$ of light delivered to the LC display element from the structured output surface of turning film 20 is determined by a number of factors including the central input principal angle $\theta_{in}$, the refractive index n of turning film 20, and the base angle β1 at which far surface 26 is slanted at an oblique angle relative to flat surface 22.

Figure 3B:
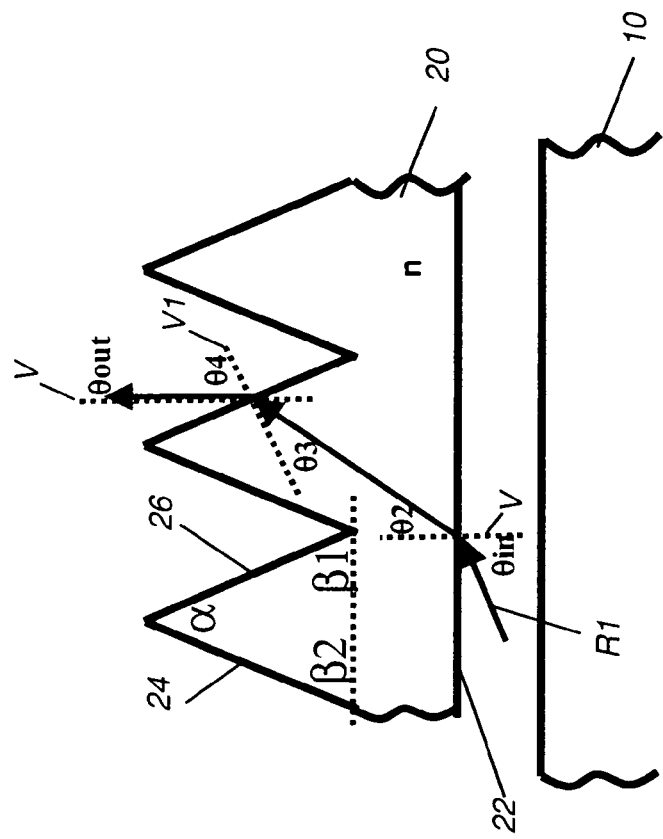
FIG. 3B is a schematic cross-sectional view showing a polarizing turning film that produces output light near the normal of the film for a first light guide plate, where there is an angle close to the Brewster's angle at the input surface and at the far surface of the turning film.
Figure 3A:
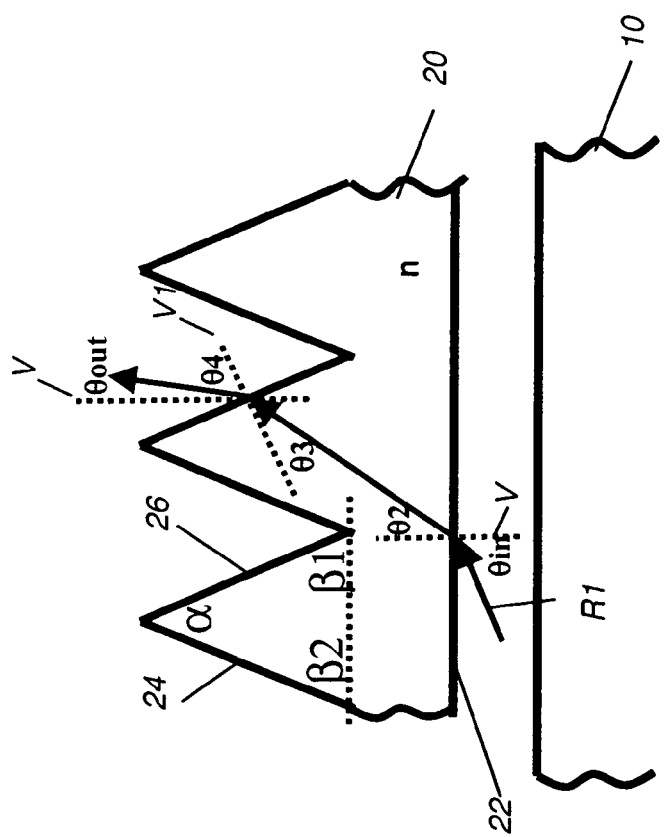
FIG. 3A is a schematic cross-sectional view showing a working principle for a polarizing turning film, where there are angles close to the Brewster's angle in the path of a dominant ray.

Referring to FIGS. 3A and 3B, key features of the improved turning film 20 of the present invention are shown. Light redirecting structures again face upward (more generally, facing outward toward the viewer and toward the LC device or other light modulator). Each light redirecting structure has a near surface 24 and a far surface 26, with reference to the location of light source 12 (FIG. 1). Far surface 26 is the light emission or exit surface as was shown in FIG. 2B. With the proper oblique slant (with respect to flat surface 22) given to far surface 26, incident light about a central illumination ray R1, also termed the principal ray, on flat surface 22 is suitably redirected toward the target angle, film normal direction V. In one embodiment, light redirecting structures are elongated linearly in an elongation direction along the surface of turning film 20, so that each light redirecting structure extends in a line from one edge of the output surface to another, often in parallel. With respect to cross-sectional views such as those of FIGS. 3A and 3B, the linear elongation direction is normal to the page. It can be appreciated that this arrangement has advantages for fabrication of turning film 20. However, there is no requirement that light redirecting structures be arranged in such an extended linear fashion. What is important is the angular relationship of the various surfaces of the light redirecting structures relative to the angle of incident light from light guiding plate 10, as shown in the cross-sectional side views of FIGS. 3A and 3B.

In embodiments of the present invention, output angle $\theta_{out}$ is determined by input angle $\theta_{in}$, refractive index n of the light redirecting structure, and far base angle $\beta_1$, as described by equation (1)

$$\theta_{out} = \beta_1 - \sin^{-1}\left\{n\sin\left[\beta_1 - \sin^{-1}\left(\frac{\sin(\theta_{in})}{n}\right)\right]\right\} \quad \text{equation (1)}$$

The incident light from a light guiding plate is incident over a group of angles that are centered about a principal angle, so that most of the incident light is within +/−10 degrees of the principal angle. Equation (1) and subsequent equations use input angle $\theta_{in}$ as the principal angle.

Figure 3C:
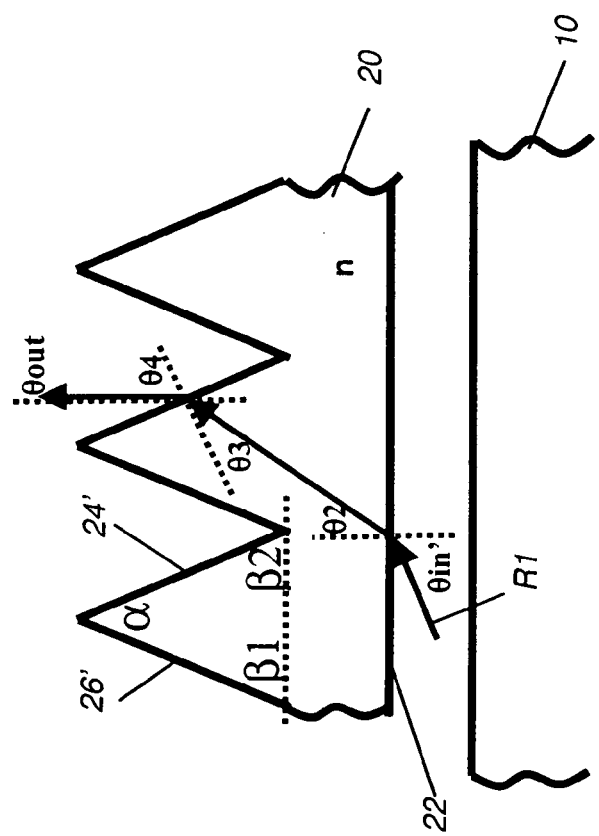
FIG. 3C is a schematic cross-sectional view showing the polarizing turning film of FIG. 3B rotated by 180 degrees about the normal of the film, producing output light near the normal of the film for a second light guide plate, where there is an angle close to the Brewster's angle at the input surface and at the far surface of the turning film.

It is instructive to note that equation (1) shows the relationship of $\theta_{out}$ to $\theta_{in}$ that applies generally for turning films using the type of upward-oriented or outward facing light redirecting structure shown in FIGS. 3A through 3C, independent of any considerations of polarization. As just one example, using values from FIG. 8 of the Arai '220 disclosure described in the background section given above, when $\theta_{in}=75°$, n=1.58, $\beta_1=75.5°$, the output angle according to equation (1) is $\theta_{out}=-0.12°$. Similarly, according to FIG. 9 of the Arai '220 disclosure, when $\theta_{in}=63°$, n=1.58, $\beta_1=71.1°$, the output angle according to equation (1) is $\theta_{out}=0.04°$. It must be emphasized, however, that equation (1) only shows light redirection, in which a turning film having this type of structure turns light from a given input angle $\theta_{in}$ to output angle $\theta_{out}$. However, once light is redirected according to equation (1), its polarization characteristics are still typically unsatisfactory. As one example, the turning film arrangement disclosed in the Arai '220 disclosure yields poor polarization and provides insufficient transmittance $T_p$ of P-polarization. Additional polarization components, or a second turning film, are necessary to improve polarization without further measures.

The present invention improves the slight polarization achieved by a turning film by utilizing the principles of polarization separation obtained with the Brewster's angle. A phenomenon that occurs at the interface of two materials having different indices of refraction $n_1$ and $n_2$ when light travels from material having index $n_1$ to material having index $n_2$, polarization separation depends on these respective indices and on the angle of incidence. In general, the Brewster's angle in material having index $n_1$ can be given as the following:

$$\text{Brewster's angle} = \tan^{-1}\left(\frac{n_2}{n_1}\right) \quad \text{equation (2)}$$

and Brewster's angle in material having index $n_2$ can be given as the following:

$$\text{Brewster's angle} = \tan^{-1}\left(\frac{n_1}{n_2}\right) \quad \text{equation (3)}$$

Brewster's angle polarization devices take advantage of the different transmission and reflection ratios of S- and P-polarized light at or near the Brewster's angle in order to separate these polarization states.

FIGS. 3A, 3B, and 3C show variations and key geometrical relationships for one embodiment of turning film 20 according to the present invention. According to the present invention, all incident angles and refracted angles $\theta_{in}$ and $\theta_2$ at input flat surface 22 and $\theta_3$ and $\theta_4$ at far surface 26 are close to the respective Brewster's angles. For ease of comparison in the following discussion, only the Brewster's angles in the air at the respective surfaces are calculated. In fact, the Brewster's angle in air ($n_{air}$=1) is the same at input flat surface 22 ($\theta_{b1}$) and at far surface 26 ($\theta_{b2}$), which is:

$$\theta_b = \tan^{-1}(n) \; \theta_{b2} = 57.7° \text{ when } n = 1.58. \quad \text{equation (4)}$$

Following the Snell's law, $$\theta_2 = \sin^{-1}\left(\frac{\sin(\theta_{in})}{n}\right) \quad \text{equation (5)}$$

$$\theta_2 = 37.7° \text{ when } n = 1.58 \text{ and } \theta_{in} = 75° \quad \text{equation (6)}$$

$$\theta_2 = 34.3° \text{ when } n = 1.58 \text{ and } \theta_{in} = 63° \quad \text{equation (7)}$$

$$\theta_4 = \sin^{-1}[n\sin(\beta_1 - \theta_2)] \quad \text{equation (8)}$$

As equation (8) shows, angle $\theta_4$ depends on index of refraction n, far base angle $\beta_1$, and angle of refraction $\theta_2$, which, in turn, depends on index of refraction n and input angle $\theta_{in}$. Thus, overall, angle $\theta_4$ depends on index of refraction n, far base angle $\beta_1$, and input angle $\theta_{in}$.

In an ideal case, the following conditions would be satisfied in order to achieve maximized output P-polarization and relatively small output S-polarization using the Brewster's angle effects:

$$|\theta_{out}|=0°, |\theta_{in}-\theta_b|=0°, \text{ and } |\theta_4-\theta_b|=0°, \quad \text{equation (9).}$$

However, the inventor has found that the conditions set forth in equation (9) cannot be exactly met for all reasonable indices of refraction n (between values 1 and 2.5), for all far base angles $\beta_1$ (between 0° and 90°), and for a light source of given input principal angle $\theta_{in}$ that is between 40° and 90°. Some compromise must be made.

In light of this difficulty, the goal of the present invention is to design a film with minimal values of $|\theta_{out}|, |\theta_{in}-\theta_b|$, and $|\theta_4-\theta_b|$ for a given incident angle $\theta_{in}$. There are many ways to choose a weighted merit function depending on minimizing values of $|\theta_{out}|, |\theta_{in}-\theta_b|$ and $|\theta_4-\theta_b|$. As a more realistic goal, it would be desirable to attempt to meet as many of the following conditions as possible by selecting a material with proper index of refraction n and providing a proper far base angle $\beta_1$ for a light source of given input angle $\theta_{in}$:

$$|\theta_{out}|<5° \qquad \text{equation (10.1)}$$

$$|\theta_{in}-\theta_b|<5°, \qquad \text{equation (10.2)}$$

$$|\theta_4-\theta_b|<5°, \qquad \text{equation (10.3)}$$

Satisfying equation (10.1) means that the output light is redirected to a near normal direction. Equations (10.2) and (10.3) guarantee that light incident at surface 22 and exiting surface 26 nearly satisfies the Brewster's angle conditions for high transmittance of desired polarization and low transmittance of undesired polarization. As modeling results given subsequently will show, it can be difficult to satisfy all of the relationships given in equations 10.1 through 10.3 in any one design. With the primary function of serving as a turning film, it is generally necessary to satisfy equation (10.1). However, in an actual design, even constraining each of the values $|\theta_{in}-\theta_b|$ and $|\theta_4-\theta_b|$ to within 10 degrees may not be feasible. Achieving this level of performance allows both turning film capability and improved polarization of the backlight illumination using the methods of the present invention. However, even if the requirements of equations (10.2) and (10.3) cannot be entirely satisfied, they provide useful goals for optimization when using the design techniques of the present invention.

As an overriding consideration, in order to cause light to hit far surface 26 first, rather than striking near surface 24, the following condition must be satisfied:

$$\beta_2 \geq 90° - \theta_2, \qquad \text{equation (11)}$$

In order to cause light to exit through far surface 26 without experiencing total internal reflection, the following relationship must be satisfied.

$$\theta_3 < \theta_{TIR} = \sin^{-1}\left(\frac{1}{n}\right), \qquad \text{equation (12)}$$

where $$\theta_3 = \beta_1 - \theta_2 = \beta_1 - \sin^{-1}\left(\frac{\sin(\theta_{in})}{n}\right) \qquad \text{equation (13)}$$

EXAMPLE 1

Referring to the contour plots of FIGS. 8A-8D, the input angle $\theta_{in}=63°$. In these plots, the abscissa (x-axis) shows the far base angle; the ordinate (y-axis) shows index of refraction n. FIGS. 8A through 8D are organized in a sequence that can be described with respect to FIG. 3A. FIG. 8A shows response at the first interface, at which light from light guiding plate 10 is incident on flat surface 22. FIG. 8B shows response at the second interface, where light within turning film 20 is incident on far surface 26. FIG. 8C shows output angle response, $\theta_{out}$. FIG. 8D is a composite contour plot, showing the overlap of results by the combined conditions represented in FIGS. 8A, 8B, and 8C. The composite contour plot of FIG. 8D then shows the "working space" available for the design of turning film 20 providing optimized polarization separation.

FIG. 8A is a contour plot with areas 1 and 2 showing a parameter space of far base angle $\beta1$ and index of refraction satisfying $|\theta_{in}-\theta_b|<5°$ (area 1) and $|\theta_{in}-\theta_b|<10°$ (area 2). FIG. 8B is a contour plot showing a parameter space of far base angle $\beta1$ and index of refraction for satisfying $|\theta_4-\theta_b|<5°$ (area 1) and $|\theta_4-\theta_b|<10°$ (area 2). FIG. 8C is a contour plot showing a parameter space of far base angle $\beta1$ and index of refraction for satisfying $|\theta_{out}|<5°$ (area 1) and $|\theta_{out}|<10°$ (area 2). FIG. 8D is a contour plot showing a parameter space of far base angle $\beta1$ and index of refraction for satisfying the following conditions: $|\theta_{in}-\theta_b|<5°, |\theta_4-\theta_b|<5°$, and $|\theta_{out}|<5°$ (area 1), and $|\theta_{in}-\theta_b|<10°, |\theta_4-\theta_b|<10°, |\theta_{out}|<10°$ (area 2).

FIG. 8D shows that in area 1 in the two-dimensional space of parameter sets (n, $\beta_1$) the conditions given above in equations (10.1)-(10.3) are all satisfied, i.e., $|\theta_{out}|<5°, |\theta_{in}-\theta_b|<5°$, and $|\theta_4-\theta_b|<5°$. In area 2, $|\theta_{out}|<10°, |\theta_{in}-\theta_b|<10°$, and $|\theta_4-\theta_b|<20°$. In areas outside of area 1 and area 2, $|\theta_{out}|>10°, |\theta_{in}-\theta_b|>10°$, or $|\theta_4-\theta_b|>10°$. It can be seen that for area 1, index of refraction n is approximately between 1.64 and 1.90, far base angle $\beta_1$ approximately between 55° and 66°.

To better appreciate the significance of these results, each of $|\theta_{out}|, |\theta_{in}-\theta_b|$, and $|\theta_4-\theta_b|$ is shown in FIG. 8A-8C, respectively. FIG. 8A shows that when, in area 1 (0°<$\beta_1$<90° and 1.62<n), the condition $|\theta_{in}-\theta_b|<5°$ is always satisfied. Referring to FIG. 8B, in area 1, $|\theta_4-\theta_b|<5°$, in area 2, $|\theta_4-\theta_b|<10°$. Referring to FIG. 8C, in area 1, $|\theta_{out}|<5°$. In area 2, $|\theta_{out}|<10°$.

It can readily be seen that $|\theta_{in}-\theta_b|<5°$ of equation (10.2) is fairly easily satisfied. For $|\theta_4-\theta_b|<5°$, for any far base angle $\beta_1$ approximately above 54° and below about 74°, there is a solution for index of refraction 1.5<n<2.0. For $|\theta_{out}|<5°$, for any far base angle $\beta_1$ approximately above 43° and below about 78°, there is a solution for index of refraction 1.5<n<2.0. In addition, the patterns for $|\theta_{out}|<5°$ and $|\theta_4-\theta_b|<5°$ are different. First, they cover different space. Second, area 1 $|\theta_4-\theta_b|<5°$ is wider for low indices of refraction, while area 1 $|\theta_{out}|<5°$ is narrower for low indices of refraction. A narrower pattern means less tolerance variation of the index of refraction n and far base angle $\beta_1$.

When all three conditions of equations (10.1), (10.2), and (10.3) must be met, there is an optimal working space as shown in area 1 of FIG. 8D.

Further studies show that there is no overlapping for $|\theta_{out}|<1°, |\theta_{in}-\theta_b|<1°$, and $|\theta_4-\theta_b|<1°$. This means that "perfect" performance cannot be achieved in practice; some compromise must be made in order to achieve the best possible effects.

EXAMPLE 2

FIGS. 9A through 9D show a similar sequence to that of FIGS. 8A through 8D, using the same light redirecting structures and materials, but with an input principal angle $\theta_{in}=70°$. By comparison with FIG. 8A, note that area 1 $|\theta_{in}-\theta_b|<5°$ in FIG. 9A does not exist for 1.5<n<2.0. Area 2 $|\theta_{in}-\theta_b|<10°$ and Area 3 $|\theta_{in}-\theta_b|<15°$ appear in this contour plot. Other behavior, shown in contour plots of FIGS. 9B and 9C, is similar to that of Example 1. In FIG. 9D, the overlap Area 1 $|\theta_{out}|<5°, |\theta_{in}-\theta_b|<5°$, and $|\theta_4-\theta_b|<5°$ does not exist. FIG. 9D shows the overlap Area 3, where $|\theta_{out}|<5°, |\theta_{in}-\theta_b|<10°$, and $|\theta_4-\theta_b|<5°$ and overlap Area 4 satisfying $|\theta_{out}|<10°, |\theta_{in}-\theta_b|<15°$, and $|\theta_4-\theta_b|<10°$.

EXAMPLE 3

Figure 10A:
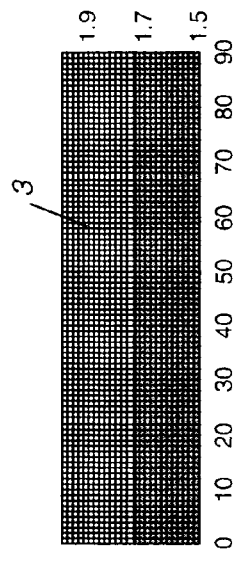
FIG. 10A is a contour plot showing a parameter space of far base angle and index of refraction satisfying $|\theta_{in}-\theta_b|<15°$ for input angle $\theta_{in}=75°$.
Figure 10B:
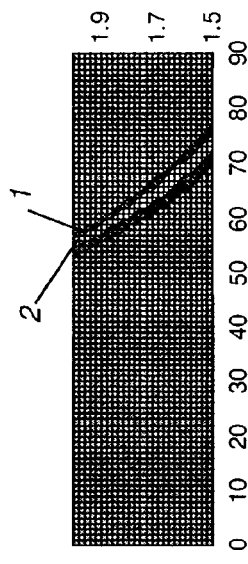
FIG. 10B is a contour plot showing a parameter space of far base angle and index of refraction for satisfying $|\theta_4-\theta_b|<5°$ and $|\theta_4-\theta_b|<10°$ for input angle $\theta_{in}=75°$.
Figure 10C:
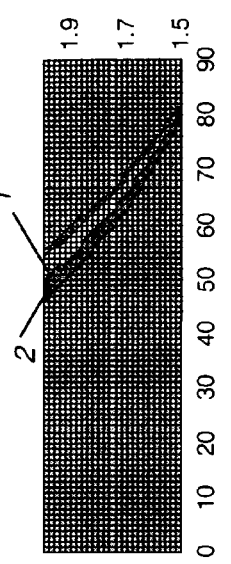
FIG. 10C is a contour plot showing a parameter space of far base angle and index of refraction for satisfying $|\theta_{out}|<5°$ and $|\theta_{out}|<10°$ for input angle $\theta_{in}=75°$.

FIGS. 10A through 10D show a similar sequence to that of FIGS. 9A through 9D, using the same structures and materials, but with an input principal angle $\theta_{in}=75°$. Neither Area 1 $|\theta_{in}-\theta_b|<5°$ nor Area 2 $|\theta_{in}-\theta_b|<10°$ exist for 1.5<n<2.0 in FIG. 10A. Area 3 in FIG. 10A satisfies $|\theta_{in}-\theta_b|<15°$. Other features in FIGS. 10B and 10C are similar to those of FIGS.

Figure 10D:
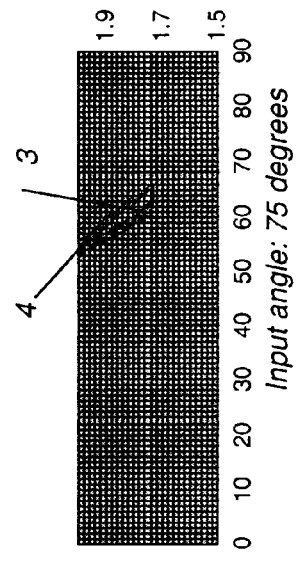
FIG. 10D is a contour plot showing a parameter space of far base angle and index of refraction for satisfying $|\theta_{in}-\theta_b|<15°$, $|\theta_4-\theta_b|<5°$, and $|\theta_{out}|<5°$, and $|\theta_{in}-\theta_b|<15°$, $|\theta_4-\theta_b|<10°$, $|\theta_{out}|<10°$ for input angle $\theta_{in}=75°$.

9B and 9C in Example 2. In FIG. 10D, Area 3 satisfies $|\theta_{out}|<5°$, $|\theta_{in}-\theta_b|<15°$, and $|\theta_4-\theta_b|<5°$ and overlap Area 4 satisfies $|\theta_{out}|<10°,|\theta_{in}-\theta_b|<15°,|\theta_4-\theta_b|<10°$.

Figure 20B:
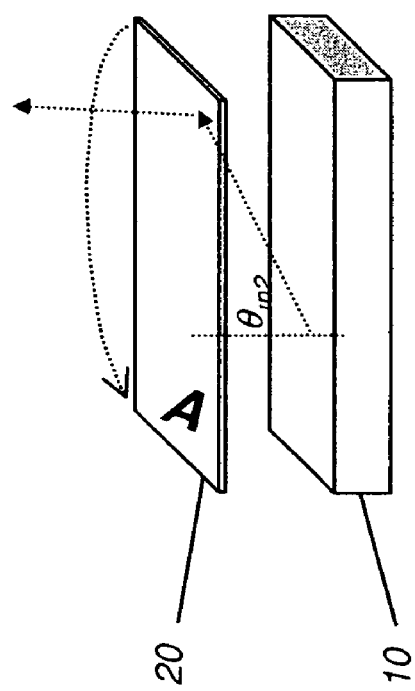
Figure 20A:
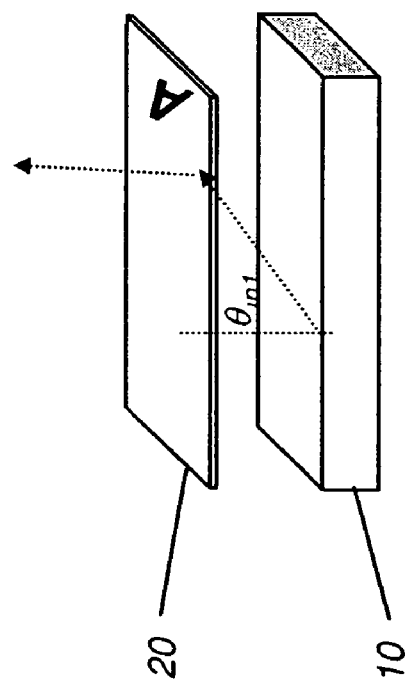

As one advantage of the present invention, polarizing turning film 20 can be formed as a light redirecting article that can be adapted to accept light over more than one principal angle or range of principal angles. Referring again to FIG. 3A, a first range of principal angles would be used to determine the relative slant of far surface 26 when turning film 20 is disposed in one position. Turning film 20 can alternately be used in an orientation in which it is rotated, within the same plane, 180 degrees from its original position. As shown in FIGS. 20A and 20B, turning film 20 is disposed in one position when incident light is at principal angle $\theta_{in1}$ and is rotated 180 degrees within the same incident plane when incident light is at principal angle $\theta_{in2}$. When this rotation is done, near surface 24 (FIG. 3A) becomes the surface at which incidence at or near Brewster's angle is desirable. That is, near surface 24, with its slope determined by base angle $\beta 2$, now performs the function of far surface 26. This would allow the optimization of turning film 20 for a different input principal angle $\theta_{in}$ than is used with turning film 20 in its original position. In this way, turning film 20 can be made adaptable so that the same piece of turning film 20 can be oriented in either of two positions, depending on the output characteristics of light guiding plate 10. FIG. 3C shows the same turning film 20 of FIG. 3A rotated in this manner. Here, the effective far surface is labeled 24' and the effective near surface labeled 26' to indicate this reversed orientation. In terms of behavior, surface 24' of FIG. 3C interacts with light in the same manner described with reference to surface 26 in FIG. 3A. The input principal angle of incident light at surface 22 is labeled input angle $\theta'_{in}$ for this example.

Using the method described with reference to FIGS. 3A, 3B, and 3C, the following steps can be used to obtain a highly polarized illumination through turning film 20:

(i) direct incident light from light guiding plate 10 at a principal angle $\theta_{in}$ that is close to Brewster's angle for the substrate of turning film 20;

(ii) orient far surface 26 of light redirecting structures of turning film 20 so that the incident light from within turning film 20 is at an angle $\theta_3$ close to Brewster's angle.

As is apparent from the contour charts of FIGS. 8A-8D, 9A-9D, and 10A-10D, in order to provide the desired polarizing behavior, the refractive index n of the substrate of turning film 20 must be relatively large, typically at least about 1.6 or higher. By performing polarization separation twice, the method of FIGS. 3A, 3B, and 3C yields illumination having high P-polarization.

The arrangement given in FIGS. 3A, 3B, and 3C shows how the use of two successive Brewster's angle interfaces obtains well polarized light within turning film 20. A conventional turning film having similar upward-oriented (that is, with respect to the viewer, outward-oriented) prismatic structures may inadvertently accept incident light from a light guiding plate at its first interface, at an angle that allows refraction within the turning film at or near Brewster's angle. However, the second interface for light within the conventional turning film conventionally redirects light by refraction at some arbitrary angle, without taking advantage of further polarization separation using the Brewster's angle. The apparatus and method of the present invention employ this second interface to take advantage of the additional opportunity to refract light at Brewster's angle a second time. The end-result provides output light that is not only redirected toward normal at $\theta_{out}$, but also exhibits a high degree of polarization.

Three-Interface Turning Films

Figure 4:
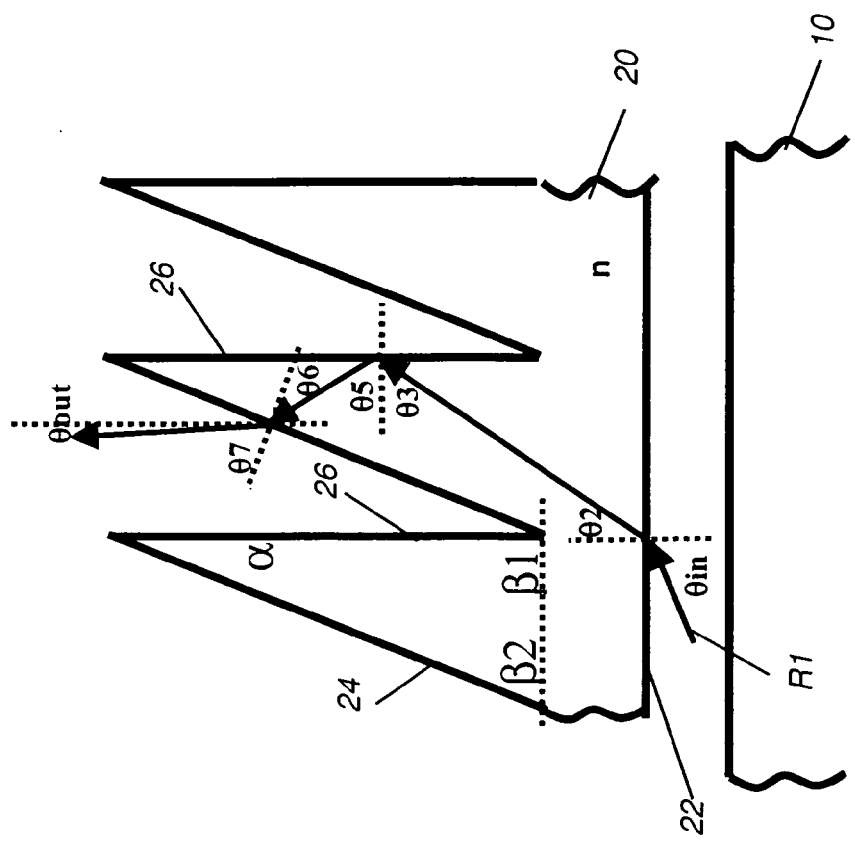
FIG. 4 is a schematic cross-sectional view showing a polarizing turning film that produces output light near the normal of the film for a first light guide plate, where there is an angle close to the Brewster's angle at the flat surface and at the near surface of the turning film.

Referring next to FIG. 4, there is shown another embodiment of the present invention, using linearly elongated light redirecting structures for providing a third interface for light within turning film 20. Here, light incident on far surface 26 is reflected using Total Internal Reflection (TIR), and is then incident at angle $\theta_6$ on near surface 24 where the refraction angle $\theta_7$ is near the Brewster's angle. With the arrangement of FIG. 4, the light path within turning film 20 includes three interfaces. The second interface does not employ the Brewster's angle. Instead, TIR occurs at the second interface.

Following the light path of FIG. 4, incident light from light guiding plate 10, at angle $\theta_{in}$, is refracted at Brewster's angle $\theta_2$. At far surface 26, the incident angle $\theta_3$ results in total internal reflection at angle $\theta_5$. The reflected light is incident at near surface 24 and refracted at Brewster's angle $\theta_7$.

As an overriding consideration, in order to cause light to be incident on far surface 26 first, the following condition must be satisfied.

$$\beta_2 \geq 90° - \theta_2, \qquad \text{Equation (11)}$$

In order to cause light to go through near surface 24 without experiencing total internal reflection, the following condition must be satisfied.

$$\theta_7 < \theta_{TIR} = \sin^{-1}\left(\frac{1}{n}\right), \qquad \text{Equation (14)}$$

where $$\theta_7 = 2\beta_1 + \beta_2 - \theta_2 - 180° \qquad \text{Equation (15)}$$
$$= (2\beta_1 + \beta_2 - 180°) - \sin^{-1}\left(\frac{\sin(\theta_{in})}{n}\right)$$

For the embodiment of FIG. 4, the light redirecting structure elements themselves can be extended outward considerably with respect to the plane of a film or sheet on which these elements are formed. These could be separately fabricated components, mounted or affixed to a substrate, for example. Other possible modifications include applying a coating to far surface 26 for conditioning the behavior of light in some manner. For example, it might be advantageous to use a reflective coating instead of using TIR reflection. Alternately, far surface 26 could be configured to recycle light, such as light having an undesirable polarization state.

Structures Added to a Substrate

Figure 5B:
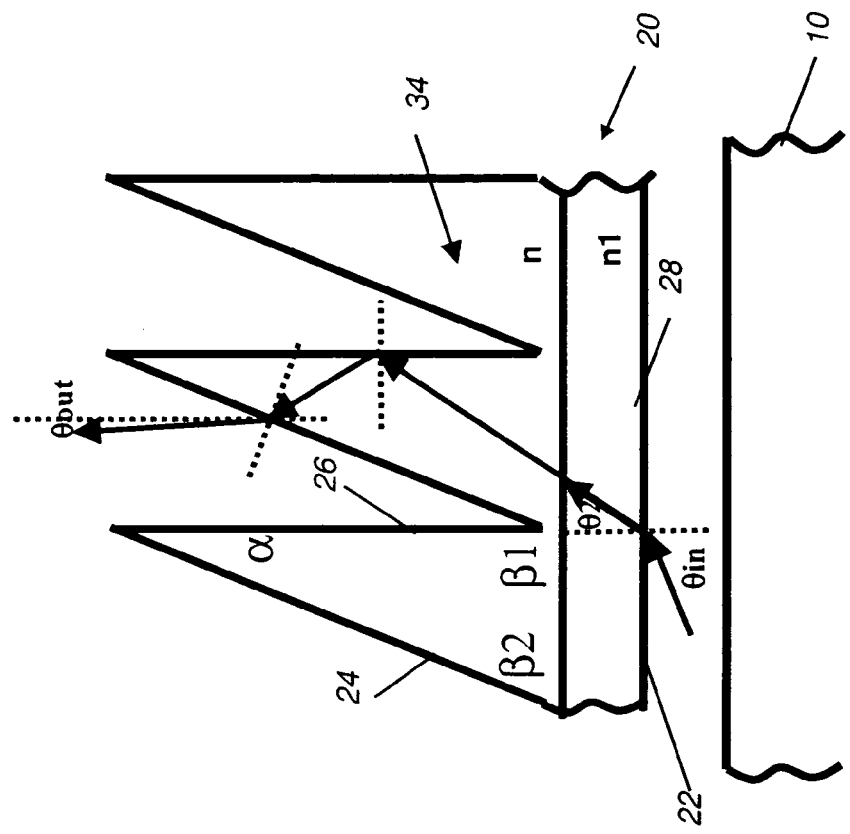
FIG. 5B is a schematic cross-sectional view showing the polarizing turning film of FIG. 4, where the substrate and the prisms have different refractive indices.
Figure 5A:
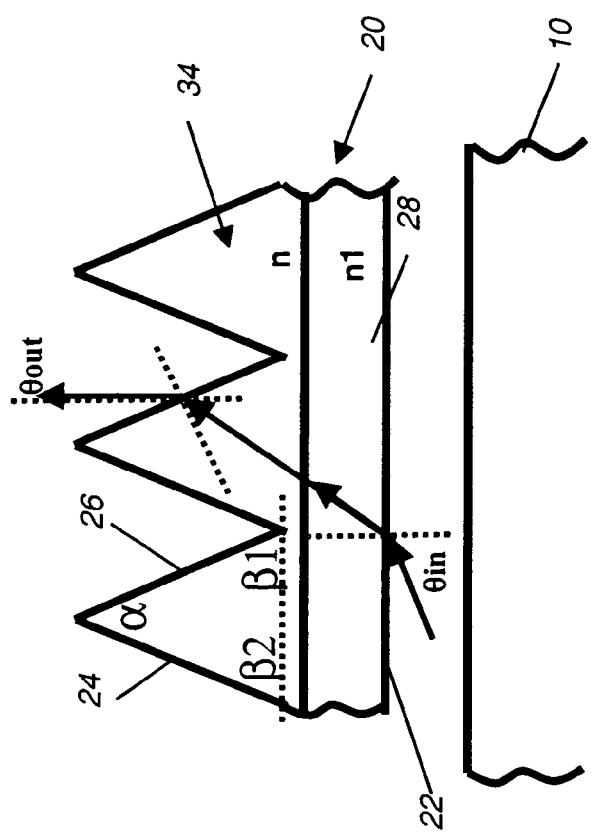
FIG. 5A is a schematic cross-sectional view showing the polarizing turning film of FIG. 3B, where the substrate and the prisms have different refractive indices.

FIGS. 3A, 3B, 3C, and 4 show turning film 20 formed from a single substrate. It may be more practical, however, to fabricate turning film 20 using more than one material, including the case where refractive indices of the materials used are the same or are different. FIG. 5A is a cross-sectional view showing polarizing turning film 20 of FIG. 3B, wherein substrate 28 and light redirecting structures 34 have different refractive indices n and n1. Here, a substrate 28 provides a surface onto which light redirecting structures 34 are attached. Light redirecting structures 34 could be formed onto a separate sheet of a transparent medium which is then affixed to substrate 28. Alternately, light redirecting structures 34 could be separately fabricated and affixed to substrate 28. FIG. 5B shows a similar arrangement for turning film 20 of FIG. 4.

Embodiments of FIGS. 5A or 5B can have advantages in cost as well as fabrication. For example, materials of lower index of refraction (1.45-1.55) are easily available and may be most suitable for substrate 28. Materials of higher index of refraction (1.6 above) are more expensive in general, but may be better suited for use in providing light redirecting structures 34. As earlier description and equation (4) indicate, a higher index of refraction may be required in order to provide Brewster's angle refraction at θ4 (FIG. 3A). By using a dual-material design, both cost reduction and high optical performance can be achieved. As can readily be appreciated by those skilled in the optical design art, when two or more materials having different indices of refraction are used, the two Brewster's angles at flat surface 22 and at near or far surface 24 or 26 are slightly different. It can be easily seen that small modifications can be easily made to achieve optimal optical performance.

Figure 5D:
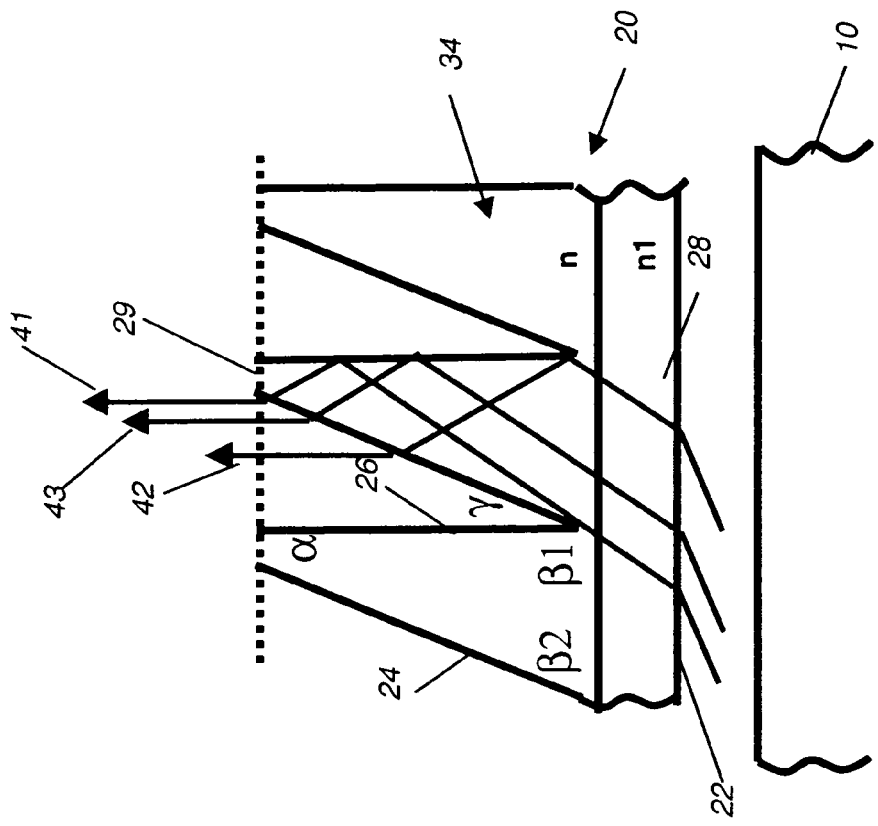
FIG. 5D is a schematic cross-sectional view showing the polarizing turning film of FIG. 5B, where the tips of the prisms are truncated and/or the groove angle is rounded.
Figure 5C:
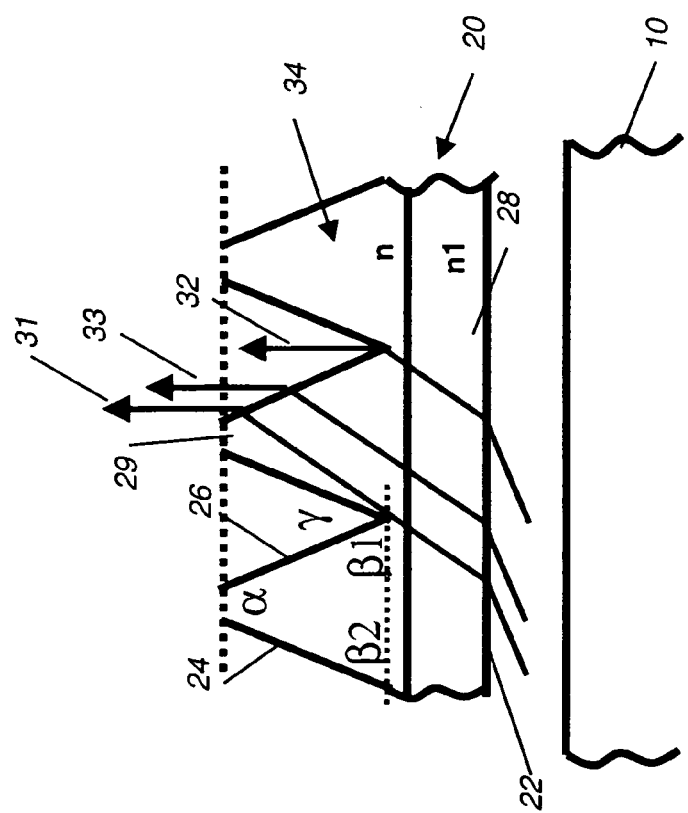
FIG. 5C is a schematic cross-sectional view showing the polarizing turning film of FIG. 5A, where the tips of the prisms are truncated and/or the groove angle is rounded.

Modifications to the basic shape of light redirecting structures may help to simplify fabrication or to change characteristics of the light path. For example, FIG. 5C is a schematic cross-sectional view showing the polarizing turning film of FIG. 5A, where the tips or apexes of light redirecting structures 34 are truncated (to the horizontal dotted line representing a truncated surface 29) and/or the groove angle y between these structures is rounded. Similarly, FIG. 5D is a schematic cross-sectional view showing the polarizing turning film of FIG. 5B, where the tips of the prisms are truncated and/or the groove angle γ is rounded. This is possible because the tips of the prisms are not used for the primary rays 31, 32, and 33 in FIG. 5C, and not used for primary rays 41, 42, and 43 in FIG. 5D.

Figure 5F:
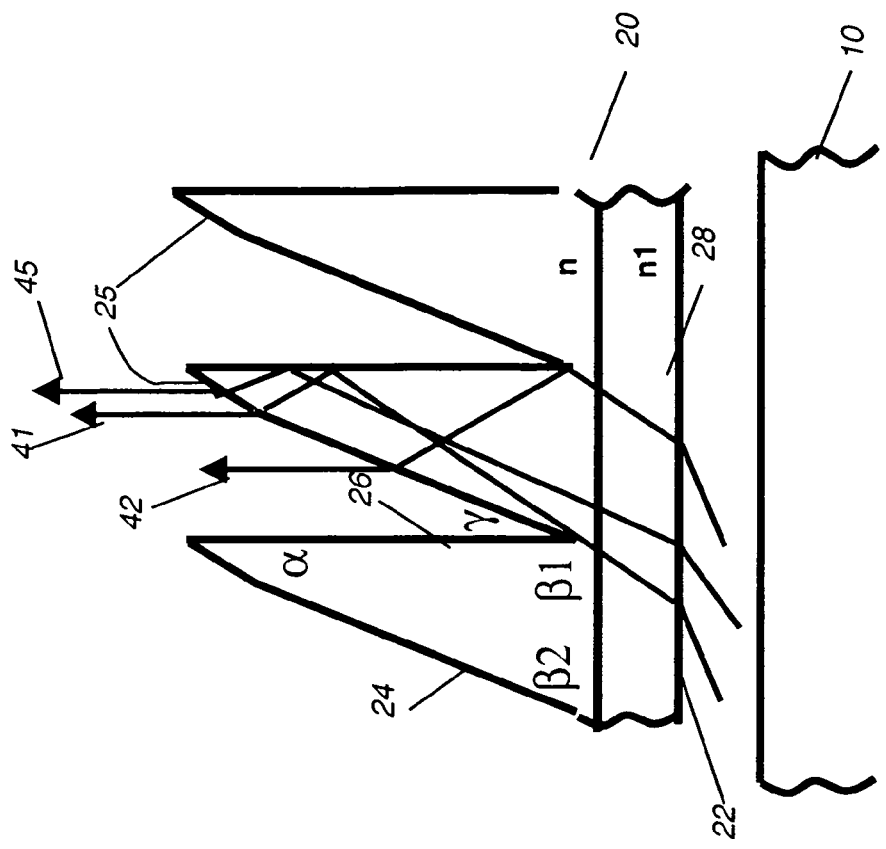
FIG. 5F is a schematic cross-sectional view showing the polarizing turning film of FIG. 5B, where the tips of the prisms have smaller inclination angle.
Figure 5E:
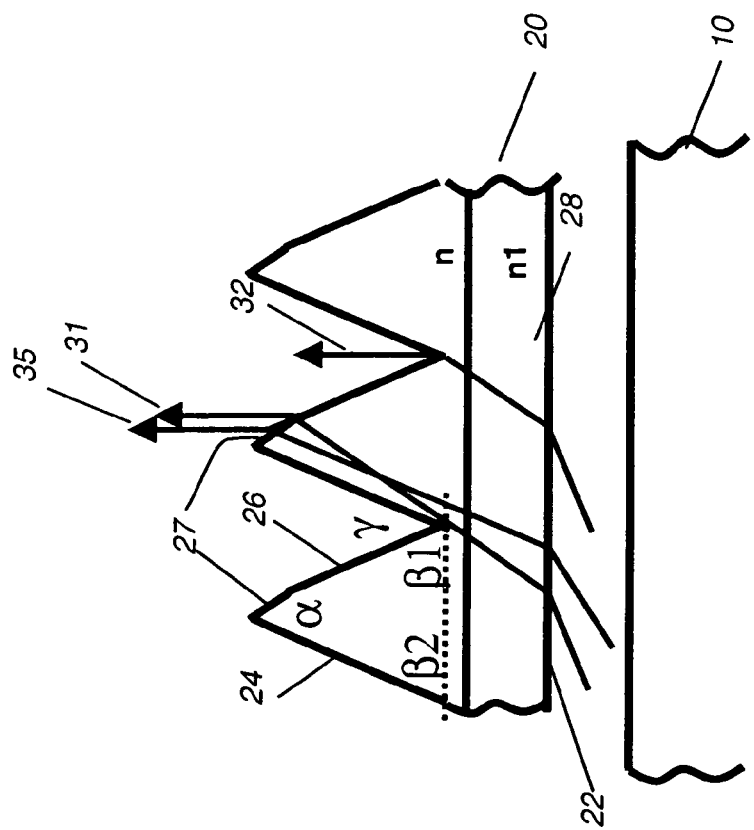
FIG. 5E is a schematic cross-sectional view showing the polarizing turning film of FIG. 5A, where the tips of the prisms have smaller inclination angle.

FIG. 5E is a schematic cross-sectional view showing the polarizing turning film of FIG. 5A, where the tips of the light redirecting structures have a smaller inclination angle above a certain point for redirecting secondary rays 35. FIG. 5F is a schematic cross-sectional view showing the polarizing turning film of FIG. 5B, where the tips of the prisms have a smaller inclination angle above a certain point for redirecting secondary rays 45. The difference between the primary rays 31, 32 and secondary rays 35 in FIG. 5E or between the primary rays 41, 42 and secondary rays 45 in FIG. 5F is that the primary rays carry more light flux, and secondary rays carry a lesser amount of light flux. With a tip surface 25 or 27 having a smaller inclination angle, secondary rays 31 nearly meets Brewster's angle condition and is turned toward the normal direction, thus maximizing the head-on luminance. As these examples show, the exit surface provided by the light redirecting structures can thus have more than one slope. Extending this concept further, the exit surface can have some amount of curvature, over the full surface or only over some portion of the surface. Furthermore, the grooves may not perfectly parallel to each other. The height of the groove can vary along the length direction.

Display Apparatus and Orientation of Polarizers

Figure 7A:
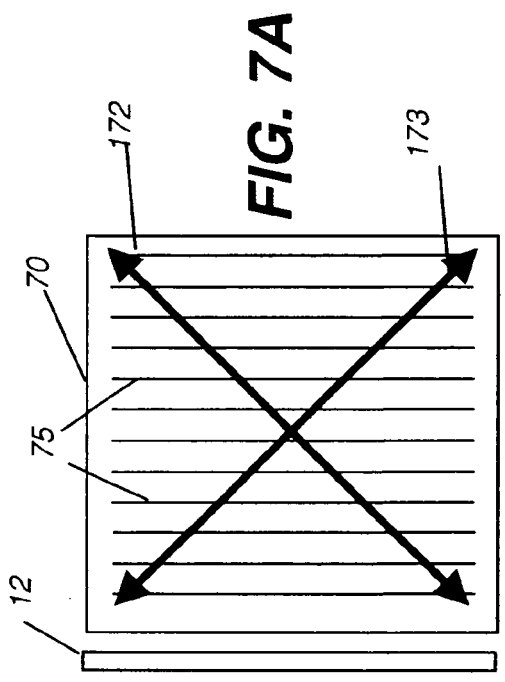
FIG. 7A is a schematic top view showing an LCD with a pair of polarizers oriented at 45 degrees relative to the grooves of the light redirecting structure of the turning film.
Figure 6:
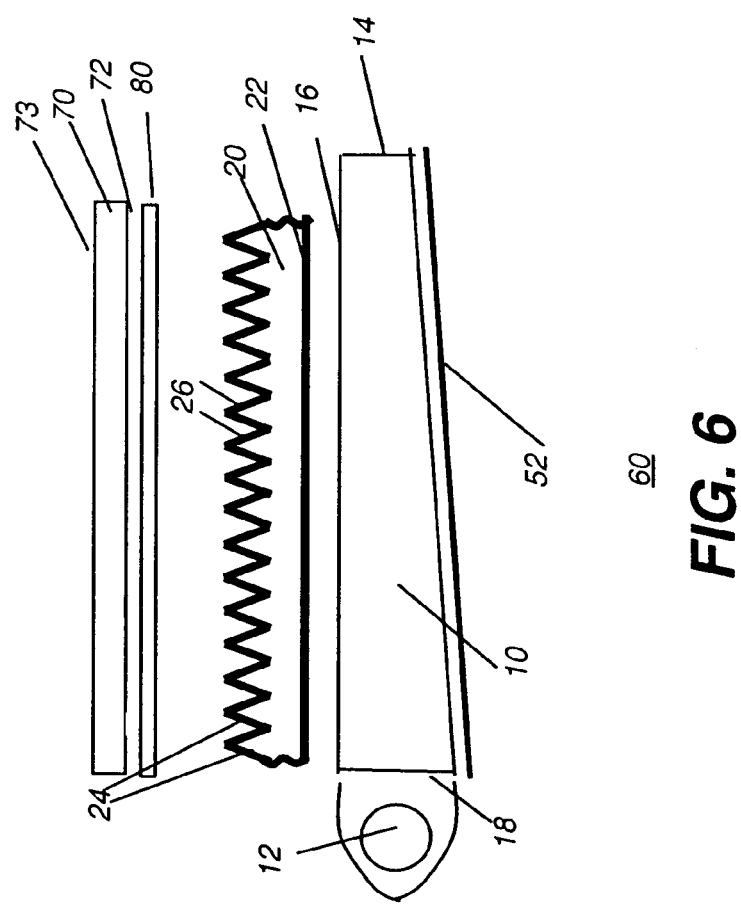
FIG. 6 is a schematic cross-sectional view showing a polarizing turning film in an LCD display system.

The apparatus and method of the present invention allow a number of possible configurations for support components to provide polarized light. FIG. 6 is a schematic cross-sectional view showing a display apparatus 60 using polarizing turning film 20 according to the present invention. An LC spatial light modulator 70 modulates polarized light received from light guiding plate 10 and turning film 20. A half-wave plate 80 is optional. A back polarizer 72 and a front polarizer 73 are provided for LC spatial light modulator 70 itself; however, these built-in polarizers are absorptive and are necessary for the operation of the LC modulator, unlike polarizing turning film 20 of the present invention which does not operate by absorbing light. FIG. 7A is a schematic top view showing polarized light transmission axes 172 and 173 for LC spatial light modulator 70, using a pair of polarizers that are oriented at 45 degrees relative to light redirecting structures 75 and grooves of turning film 20 that extend vertically in the view of FIG. 7A. In this case, a half-wave plate 80 is provided between turning film 20 and LC spatial light modulator 70 to change the polarization direction of the polarized light from parallel to the cross section plane to parallel to rear polarizer 72. The optical axis of half-wave plate 80 is oriented at 22.5 degrees relative to rear polarizer 72.

Figure 7B:
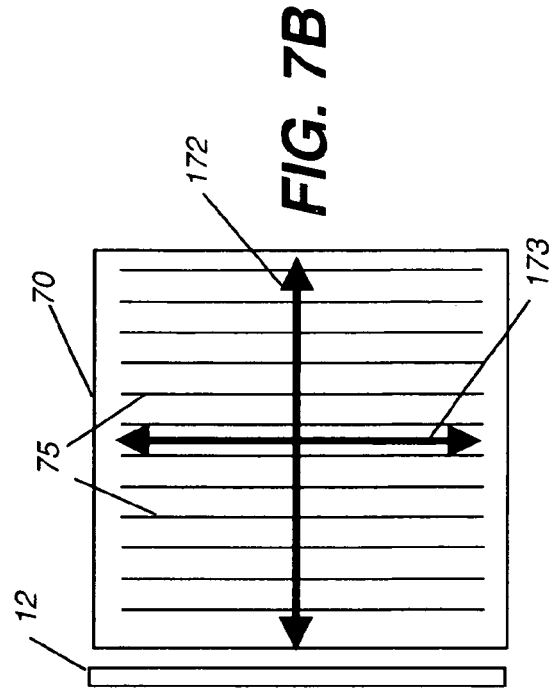
FIG. 7B is a schematic top view showing an LCD with a pair of polarizers oriented at parallel or perpendicular to the grooves of the light redirecting structure of the turning film.

FIG. 7B is a schematic top view showing polarized light transmission axes 172 and 173 for LC spatial light modulator 70, using a pair of polarizers oriented at parallel or perpendicular relative to the grooves and light redirecting structures 75 of turning film 20. In this case, the LC spatial light modulator 70 can use vertically aligned (VA) LCD or IPS LC elements. Rear polarizer transmission axis 172 is parallel to the plane of the cross section, thus, half-wave plate 80 is not needed.

In one embodiment the display apparatus comprises a pair of crossed polarizers, wherein the light redirecting structures are elongated in an elongation direction and wherein each of the crossed polarizers is oriented either substantially parallel or perpendicular to the elongation direction of the light redirecting article. In another embodiment the display apparatus comprises a half wave plate and a pair of crossed polarizers, wherein the light redirecting structures are elongated in an elongation direction and wherein the polarizers are substantially oriented at +/−45 degrees relative to the elongation direction of the light redirecting article.

Figure 7C:
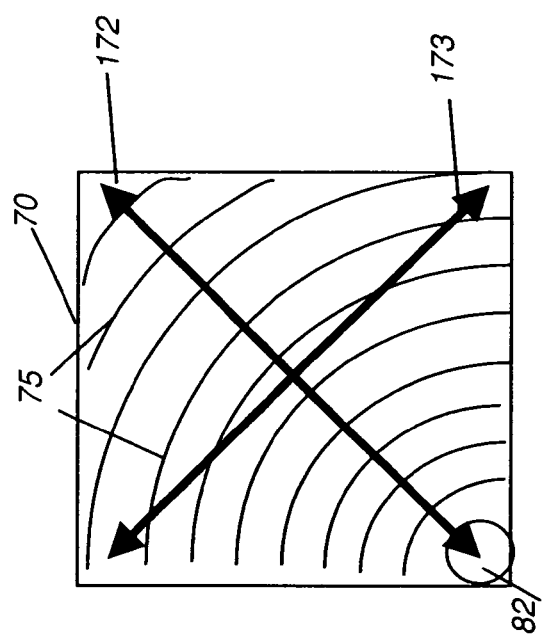
FIG. 7C is a schematic top view showing a polarizing turning film with arcuate grooves; and, FIG. 8A is a contour plot showing a parameter space of far base angle and index of refraction for satisfying $|\theta_{in}-\theta_b|<5°$ and $|\theta_{in}-\theta_b|<10°$ for input angle $\theta_{in}=63°$.

As shown in FIG. 7A, light redirecting structures 75 may be elongated in a linear direction and extend substantially in parallel. FIG. 7C is a schematic top view showing polarizing turning film 20 with arcuately elongated light redirecting structures 75 in another embodiment. This arrangement is advantageous for employing a point light source such as Light Emitting Diode (LED) at one or more corners of light guiding plate 10 in order to have a more compact design. The rear polarizer transmission axis 172 is more or less parallel to the plane of the cross section, thus, half-wave plate 80 is not needed.

Materials for Forming Turning Film 20

Turning film 20 of the present invention can be fabricated using materials having a relatively high index of refraction, including sulfur-containing polymers, particularly polythiourethane, polysulfide and the like. Materials of high index of refraction also include polycarbodiimide copolymers which are excellent in heat stability and has high workability and moldability, as is disclosed in U.S. Patent Application Publication No. 2004/0158021 entitled "Polycarbodiimide having high index of refraction and production method thereof" by Sadayori et al., published on Aug. 12, 2004. Indices of refraction for these materials varied from 1.738 to 1.757 at 589 nm. Materials with doped microspheres or beads of high index materials such as titania, zirconia, and baria also show high indices of refraction that may be smaller or greater than 1.7, as disclosed in U.S. Patent Application Publication No. 2004/0109305 entitled "HIGH INDEX COATED LIGHT MANAGEMENT FILMS" by Chisholm et al. Materials of high index of refraction also include many polyesters such as polyethylene naphthalate (PEN) and Polybutylene 2,6-Naphthalate (PBN). These materials have refractive indices varying from about 1.64 to as high as about 1.9, as discussed in U.S. Pat. No. 6,830,713 entitled "Method for making coPEN/PMMA multilayer optical films" to Hebrink et al. Other known materials having a high index of refraction can be used as well.

Results for Example Embodiments

Table 1 of FIG. 11 shows inventive and comparative examples that illustrate how turning film 20 of the present invention performs under various conditions and using various materials. For these exemplary embodiments, film design is specified by the far base angle $\beta_1$, near base angle $\beta_2$, and the index of refraction n. The film performance is given by output angle $\theta_{out}$, the transmittance of P-polarization $T_p$ and transmittance of S-polarization $T_s$. The two Brewster's angle conditions, at input and exit surfaces respectively, are given by $\theta_{in}-\theta_b$ and $\theta_4-\theta_b$. A Y entry in the right-most column indicates a satisfactory result. Overall, the target for the turning film is to make sure $|\theta_{out}|\leq 5°$ while maximizing $T_p$ and keeping $T_s$ low. However, maximizing $T_p$ is more important than keeping $T_s$ low. When $|\theta_{in}-\theta_b|<16°$ (or $|\theta_4-\theta_b|<16°$), it is considered that the Brewster's angle condition is approximately met for the input surface (or exit surface).

It is instructional to observe that, for the purpose of comparison, Example 1 in Table 1 uses the same values as those given in FIG. 8 of the Arai '220 disclosure, cited earlier. A film having the characteristics shown for Example 1 works for $\theta_{in}=75°$, which yields acceptable results in $\theta_{out}=-0.12°$, $T_p=79.7\%$, and $T_s=31.5\%$. However, this provides a solution only at the incident principal angle $\theta_{in}$ of 75 degrees. This film does not work well for principal incident angle $\theta_{in}=70°$ or for $\theta_{in}=63°$ because output angle value $\theta_{out}=-8.46°$ for $\theta_{in}=70°$ deviates significantly from the normal or target direction. In addition, even where $\theta_{out}=-0.12°$ is obtained, the transmittance value $T_p=79.7\%$ is relatively low.

Note that for principal incident angle $\theta_{in}=63°$, the value of $\theta_{out}$ is NA (not applicable), which means the light cannot go through the film as shown in FIG. 2A due to the total internal reflection at the far surface 26. Consequently, the exit surface interface value of $\theta_4-\theta_b$ is also NA. This notation also applies to Examples 3.4, 3.5, 3.7, and 4.6 for $\theta_{in}=63°$. This behavior occurs because the condition specified by equation (12) is not satisfied. From equation (13), $$\begin{aligned}\theta_3 &= \beta_1 - \theta_2 \\ &= \beta_1 - \sin^{-1}\left(\frac{\sin(\theta_{in})}{n}\right) \\ &= 75.5° - \sin^{-1}\left(\frac{\sin(63°)}{1.58}\right) \\ &= 41.2°,\end{aligned}$$

which is greater than $$\theta_{TIR} = \sin^{-1}\left(\frac{1}{n}\right) = \sin^{-1}\left(\frac{1}{1.58}\right) = 39.3°.$$

Similarly, Example 2 in Table 1 uses the same values as those given in FIG. 9 of the Arai '220 disclosure, cited above. A film having the characteristics shown for Example 2 works for principal incident angle $\theta_{in}=63°$, which results in $\theta_{out}=0.04°$, with $T_p=94.7\%$, and $T_s=49.8\%$. However, this provides a solution only at the principal angle $\theta_{in}$ of 63 degrees. This film does not work well for a principal angle of $\theta_{in}=70°$ or $\theta_{in}=75°$ because output angle values $\theta_{out}=7.29°$ and $\theta_{out}=10.63°$ vary significantly from the normal direction.

For Examples 3.1-3.8, a larger index of refraction n is used, with n=1.68 for each case. For this grouping of examples, far and near base angles $\beta_1$ and $\beta_2$ are varied and results are shown for different principal incident angles $\theta_{in}$. In Example 3.1, $\beta_1=\beta_2=64.5°$. This film works for $\theta_{in}=63°$, but is not satisfactory for $\theta_{in}=70°$, or $\theta_{in}=75°$ in terms of output angle $\theta_{out}$ performance. This film has much higher $T_p=99.2\%$ than do conventional designs (Example 1 and Example 2). Transmittance $T_s$ is low, with $T_s=52.5\%$. Note that for all three incident angles $\theta_{in}=63°$, $\theta_{in}=70°$, and $\theta_{in}=75°$, the two Brewster's angle conditions (the incident angles $\theta_{in}$ and $\theta_4$ are within +/−16 degrees of the Brewster's angle) are approximately satisfied, but only when principal angle $\theta_{in}=63°$ are the three conditions satisfied simultaneously.

In example 3.2, base angles $\beta_1=\beta_2=66.0°$. This film works acceptably for principal angles $\theta_{in}=63°$ and $\theta_{in}=70°$, but not for $\theta_{in}=75°$ in terms of output angle $\theta_{out}$ performance. This film has higher $T_p=96.5\text{-}96.6\%$ than with previous designs. Transmittance $T_s=46.5\text{-}46.6\%$ is lower than for conventional devices. Note this single film, when positioned at the same orientation, works acceptably for two different principal incident angles $\theta_{in}$ and for angles between these two different principal angles.

In example 3.3, base angles $\beta_1=\beta_2=67.5°$. This film works for principal incident angles $\theta_{in}=75°$ and $\theta_{in}=70°$, but not for $\theta_{in}=63°$ in terms of output angle $\theta_{out}$ performance. For $\theta_{in}=75°$, this film has much higher transmittance $T_p=90.2\%$ than that provided by earlier approaches, although value $T_s=38.3\%$ is slightly higher than conventional $T_s=31.5\%$. Again, this single film, when positioned at the same orientation, works acceptably for two different incident angles $\theta_{in}$ and for angles between these two different incident angles.

In example 3.4, base angles $\beta_1=\beta_2=69.5°$. This film works for principal angle $\theta_{in}=75°$, but not for $\theta_{in}=70°$, or $\theta_{in}=63°$ in terms of output angle $\theta_{out}$ performance. For principal angle $\theta_{in}=75°$, this film has much higher transmittance $T_p=86.32\%$ than that provided by earlier approaches that yield $T_p=79.7\%$. The low transmittance value $T_s=32.2\%$ is slightly higher than that provided by earlier approaches that yield $T_s=31.5\%$.

In example 3.5, base angles $\beta_1=\beta_2=70.0°$. This film works for principal angle $\theta_{in}=75°$, but not for $\theta_{in}=70°$, or $\theta_{in}=63°$ in terms of output angle $\theta_{out}$ performance. For principal angle $\theta_{in}=75°$, this film has higher transmittance $T_p=83.6\%$ than that provided by earlier approaches that yield $T_p=79.7\%$, and lower $T_s=29.6\%$ than that provided by earlier approaches that yield $T_s=31.5\%$.

In example 3.6, base angles $\beta_1=64.5°$ and $\beta_2=67.5°$. This film works for principal angle $\theta_{in}=63°$ in one orientation, and works for $\theta_{in}=70°$ and $\theta_{in}=75°$ when it is rotated by 180 degrees about the normal of the film (in the second rotated orientation, the base angles are reversed, so that $\beta_1=67.5°$ and $\beta_2=64.5°$) In this way, a single film works for all three incident principal angles, in terms of output angle $\theta_{out}$ performance, having all the advantages listed above with respect to Examples 3.1 and 3.3.

Examples 3.7 and 3.8 show other combinations that are possible, but do not produce satisfactory results. In example 3.7, base angles $\beta_1=\beta_2=70.5°$. This film does not work well for any of the tested incident principal angles $\theta_{in}=63°$, $\theta_{in}=70°$, or $\theta_{in}=75°$ in terms of output angle $\theta_{out}$ performance. In example 3.8, base angles $\beta_1=\beta_2=61.5°$. This film does not work well for principal angles $\theta_{in}=63°, \theta_{in}=70°$, or $\theta_{in}=75°$ in terms of output angle $\theta_{out}$ performance, despite the fact the two Brewster's angle conditions are met.

In above examples 3.1 through 3.8, the range of base angles satisfies:

$$61.5°\leq\beta_1,\beta_2\leq 70.5°$$

The following relationship of $\beta_2$ and angle $\theta_2$:

$$\beta_2 \geq 90° - \theta_2, \qquad \text{Equation (11)}$$

is always satisfied because $90°-\theta_2=58.0°$ for $\theta_{in}=63°$, $90°-\theta_2=56.0°$ for $\theta_{in}=70°$, and $90°-\theta_2=54.9°$ for $\theta_{in}=75°$.

Referring to Table 2 in FIG. 12, there are shown additional examples, using the case where the index of refraction n=1.78. For these examples, the following are satisfied:

$$\beta_2 \geq 90°-\theta_2=59.96° \text{ for } \theta_{in}=63°$$

$$\beta_2 \geq 90°-\theta_2=58.1° \text{ for } \theta_{in}=70°$$

$$\beta_2 \geq 90°-\theta_2=57.1° \text{ for } \theta_{in}=75°.$$

In Example 4.1, base angles $\beta_2=59.0°$, $\beta_2=60.0°$. This film works well for principal angles $\beta_{in}=63°$ and $\theta_{in}=70°$, but not for $\theta_{in}=75°$ in terms of output angle $\theta_{out}$ performance. The two Brewster's angle conditions are satisfied for all three incident angles.

In Example 4.2, base angles $\beta_1=\beta_2=60.0°$. This film works well for principal angles $\theta_{in}=63°$ and $\theta_{in}=70°$, but not for $\theta_{in}=75°$ in terms of output angle $\theta_{out}$ performance.

In Example 4.3, base angles $\beta_1=\beta_2=60.5°$. This film works well for principal angles $\theta_{in}=63°$, $\theta_{in}=70°$, and $\theta_{in}=75°$ in terms of output angle $\theta_{out}$ performance in the same orientation. Transmittivity values $T_p$ are much higher than for earlier solutions, and $T_s$ values correspondingly lower.

In Example 4.4, base angles $\beta_1=\beta_2=62.0°$. This film works well for principal angles $\theta_{in}=70°$ and $\theta_{in}=75°$, but not for $\theta_{in}=63°$ in terms of output angle $\theta_{out}$ performance in the same orientation.

In Example 4.5, base angles $\beta_1=60.0°$, $\beta_2=62.0°$. This film combines features of Examples 4.2 and 4.4. The film works well for principal angles $\theta_{in}=63°$ and $\theta_{in}=70°$ in one orientation. When it is rotated by 180 degrees to a second orientation, this turning film works well for both principal angles $\theta_{in}=70°$ and $\theta_{in}=75°$. Note that either orientation will work for $\theta_{in}=70°$. However, there is a small difference in output. When $\beta_1=60.0°$, $\beta_2=62.0°$, $T_p=97.1\%$, $T_s=46.0\%$, $\theta_{out}=2.93°$. When $\beta_1=62.0°$, $\beta_2=60.0°$, $T_p=97.1\%$, $T_s=42.1\%$, $\theta_{out}=-1.33°$. This type of film offers flexibility when other factors are considered.

In Example 4.6, base angles $\beta_1=\beta_2=65.0°$. This film does not work well for $\theta_{in}=63°$, $\theta_{in}=70°$, or $\theta_{in}=75°$ in terms of output angle $\theta_{out}$ performance.

In Example 4.7, base angles $\beta_1=55.5°$, $\beta_2=60.0°$. This film does not work well for $\theta_{in}=63°$, $\theta_{in}=70°$, or $\theta_{in}=75°$ in terms of output angle $\theta_{out}$ performance.

Referring to Table 3 in FIG. 13, there are shown additional examples, using the case where the index of refraction n=1.88. For these examples, the following are satisfied:

$$\beta_2 \geq 90°-\theta_2=61.7° \text{ for } \theta_{in}=63°$$

$$\beta_2 \geq 90°-\theta_2=60.01° \text{ for } \theta_{in}=70°$$

$$\beta_2 \geq 90°-\theta_2=59.08° \text{ for } \theta_{in}=75°.$$

In Example 5.1, base angles $\beta_1=55.0°$, $\beta_2=61.7°$. This film works well for principal angles $\theta_{in}=63°$, $\theta_{in}=70°$, and $\theta_{in}=75°$ in terms of output angle $\theta_{out}$ performance. The two Brewster's angle conditions are satisfied for all three incident angles $\theta_{in}$.

In Example 5.2, base angles $\beta_1=55.5°$, $\beta_2=61.7°$. This film works well for principal angles $\theta_{in}=63°$, $\theta_{in}=70°$, and $\theta_{in}=75°$ in terms of output angle $\theta_{out}$ performance. The two Brewster's angle conditions are satisfied for all three incident angles.

In Example 5.3, base angles $\beta_1=56.0°$, $\beta_2=61.7°$. This film works well for principal angles $\theta_{in}=63°$, $\theta_{in}=70°$, and $\theta_{in}=75°$ in terms of output angle $\theta_{out}$ performance. The two Brewster's angle conditions are satisfied for all three incident angles.

In Example 5.4, base angles $\beta_1=60.0°$, $\beta_2=61.7°$. This film does not work well for principal angles $\theta_{in}=63°$, $\theta_{in}=70°$, or $\theta_{in}=75°$ in terms of output angle $\theta_{out}$ performance.

In Example 5.5, base angles $\beta_1=50.5°$, $\beta_2=61.7°$. This film does not work well for principal angles $\theta_{in}=63°$, $\theta_{in}=70°$, or $\theta_{in}=75°$ in terms of output angle $\theta_{out}$ performance.

In summary, using the parameters shown in Table 3 of FIG. 13, the following must be satisfied:

$$51.0° \leq \beta_1 \leq 59.5°$$

in order for one of three principal angles $\theta_{in}=63°$, $\theta_{in}=70°$, and $\theta_{in}=75°$ to work. However, base angle $\beta_2$ must not be less than 61.7° for $\theta_{in}=63°$. Given these relationships, it would not be advantageous to rotate the film for acceptable performance.

Referring to Table 4 in FIG. 14, there are shown additional examples, using the case where the index of refraction n=1.98. For these examples, the following are satisfied:

$$\beta_2 \geq 90°-\theta_2=63.3° \text{ for } \theta_{in}=63°$$

$$\beta_2 \geq 90°-\theta_2=61.7° \text{ for } \theta_{in}=70°$$

$$\beta_2 \geq 90°-\theta_2=60.8° \text{ for } \theta_{in}=75°.$$

In Example 6.1, base angles $\beta_1=50.5°$, $\beta_2=63.2°$. This film works well for principal angles $\theta_{in}=63°$, $\theta_{in}=70°$, and $\theta_{in}=75°$ in terms of output angle $\theta_{out}$ performance.

In Example 6.2, base angles $\beta_1=51.5°$, $\beta_2=63.2°$. This film works well for principal angles $\theta_{in}=63°$, $\theta_{in}=70°$, and $\theta_{in}=75°$ in terms of output angle $\theta_{out}$ performance.

In Example 6.3, base angles $\beta_1=55.5°$, $\beta_2=63.2°$. The film does not work well for principal angles $\theta_{in}=63°$, $\theta_{in}=70°$, or $\theta_{in}=75°$ in terms of output angle $\theta_{out}$ performance.

In Example 6.4, base angles $\beta_1=46.0°$, $\beta_2=63.2°$. This film does not work well for principal angles $\theta_{in}=63°$, $\theta_{in}=70°$, or $\theta_{in}=75°$ in terms of output angle $\theta_{out}$ performance.

In summary, using the parameters shown in Table 4 of FIG. 14, the following must be satisfied:

$$46.5° \leq \beta_1 \leq 55.0°$$

in order for one of three angles $\theta_{in}=63°$, $\theta_{in}=70°$, and $\theta_{in}=75°$ to work. However, base angle $\beta_2$ must be not less than 63.3° for $\theta_{in}=63°$. Given these relationships, it would not be advantageous to rotate the film for acceptable performance.

Referring to Table 5 in FIG. 15, there are shown additional examples, using the case where the index of refraction n=2.38. For these examples, the following are satisfied:

$$\beta_2 \geq 90°-\theta_2=68.0° \text{ for } \theta_{in}=63°$$

$$\beta_2 \geq 90°-\theta_2=66.7° \text{ for } \theta_{in}=70°$$

$$\beta_2 \geq 90°-\theta_2=66.0° \text{ for } \theta_{in}=75°.$$

In Example 7.1, base angles $\beta_2=37.0°$, $\beta_2=68.0°$. The film works for principal angles $\theta_{in}=63°$, $\theta_{in}=70°$, and $\theta_{in}=75°$ in terms of output angle $\theta_{out}$ performance. But because the two Brewster's angle conditions are not met, $T_p$ is less than 90%.

In Example 7.2, base angles $\beta_1=38.5°$, $\beta_2=68.0°$. This film works well for principal angles $\theta_{in}=63°$, $\theta_{in}=70°$, and $\theta_{in}=75°$ in terms of output angle $\theta_{out}$ performance. But, because the two Brewster's angle conditions are not met, $T_p$ is less than 91%.

In Example 7.3, base angles $\beta_1=42.0°$, $\beta_2=68.0°$. This film does not work well for principal angles $\theta_{in}=63°$, $\theta_{in}=70°$, or $\theta_{in}=75°$ in terms of output angle $\theta_{out}$ performance.

In Example 7.4, base angles $\beta_2=33.5°$, $\beta_2=68.0°$. This film does not work well for principal angles $\theta_{in}=63°$, $\theta_{in}=70°$, or $\theta_{in}=75°$ in terms of output angle $\theta_{out}$ performance.

In summary, using the parameters shown in Table 5 of FIG. 15, the following must be satisfied:

$$34.0° \leq \beta_1 \leq 41.5°$$

for one of three principal angles $\theta_{in}=63°$, $\theta_{in}=70°$, and $\theta_{in}=75°$ in order to redirect light with 5 degrees relative to the normal of the film. However, base angle $\beta_2$ must be not less than 68.0° for $\theta_{in}=63°$. Given these relationships, it would not be advantageous to rotate the film for acceptable performance.

Note that in Examples 7.1. and 7.2, due to relatively large absolute value of $\theta_4-\theta_b$ (greater than 24°), the transmittance $T_p$ is only up to 90.9%, in general, lower than the values from Examples 3.1-3.6, 4.1-4.5, 5.1- 5.3, and 6.1-6.2. Though films of Examples 7.1 and 7.2 are acceptable, they are not preferred when compared to those of Examples 3.1-3.6, 4.1-4.5, 5.1- 5.3, and 6.1- 6.2.

Three-Interface Turning Film Embodiments

Table 6 of FIG. 16 shows inventive and comparative examples that illustrate how turning film 20 of the present invention performs under various conditions and using various materials.

In example 3.2B, base angles $\beta_1=90.0°$, $\beta_2=66.0°$. This film is similar to Example 3.2 except $\beta_1=90.0°$ stead of $\beta_1=66.0°$. The performance is also similar except the sign of $\theta_{out}$ is changed, indicating the light direction relative to the normal of the film changes, but the absolute value remains the same. This film works acceptably for principal angles $\theta_{in}=63°$ and $\theta_{in}=70°$, but not for $\theta_{in}=75°$ in terms of output angle $\theta_{out}$ performance.

Example 3.7B is similar to Example 3.7, Example 3.8B is similar to Example 3.8, and Example 4.3B is similar to Example 7, except base angles $\beta_1=90.0°$. The near base angle $\beta_2$ remains the same as their counterparts. The performance is the same except the sign of $\theta_{out}$ is changed.

Note that for principal angle $\theta_{in}=63°$, the value of $\theta_{out}$ is NA (not applicable), which means the light cannot go through the film as shown in FIG. 4 due to the total internal reflection at the near surface 24. Consequently, the value of $\theta_7-\theta_b$ is also NA. From Tables 8 and 9 in FIGS. 18 and 19 respectively, this also applies to Examples 9.3 for principal angles $\theta_{in}=63°$ and $\theta_{in}=70°$, and Examples 10.3 for $\theta_{in}=63°$.

For Example 3.7B, for $\theta_{in}=63°$:

$$\theta_7 = (2\beta_1 + \beta_2 - 180°) - \sin^{-1}\left(\frac{\sin(\theta_{in})}{n}\right) = 38.5°,$$

which is greater than $$\theta_{TIR} = \sin^{-1}\left(\frac{1}{n}\right) = \sin^{-1}\left(\frac{1}{1.68}\right) = 36.5°.$$

Thus, the condition specified by Equation (15) is not satisfied. As a result, total internal reflection occurs at near surface 24.

These examples show how three-interface turning films 20 are related to two-interface turning films 20 when the index of refraction is relatively small (n=1.68, 1.78) so that in the two-interface turning films $\beta_1 \geq \beta_2$.

Table 7 of FIG. 17 show Examples 8.1-8.3 for n=1.68 or n=1.78 where $\beta_1 < 90°$, unlike the Examples in Table 6.

Example 8.1 is identical to Example 3.7B except $\beta_1$ has a different value. In Example 8.1, $\beta_1=89°$ while in Example 3.7B, $\beta_1=90°$. The film of Example 8.1 works acceptably for $\theta_{in}=75°$ and $\theta_{in}=70°$ in terms of output angle $\theta_{out}$ performance, while the film of Example 3.7B does not work acceptably for principal angles $\theta_{in}=63°\theta_{in}=70°$, or $\theta_{in}=75°$ in terms of output angle $\theta_{out}$ performance.

Example 8.2 is identical to Example 8.1 except that $\beta_2$ has a different value. In Example 8.1, $\beta_2=70.5°$ while in Example 8.2, $\beta_2=68.5°$. The film of Example 8.2 works acceptably for principal angles $\theta_{in}=63°$ and $\theta_{in}=70°$ in terms of output angle $\theta_{out}$ performance. It also provides high $T_p$ and low $T_s$.

In Example 8.3, n=1.78, $\beta_1=89°$ and $\beta_2=63.5°$. This film works acceptably for principal angles $\theta_{in}=63°$, $\theta_{in}=70°$, and $\theta_{in}=75°$ in terms of output angle $\theta_{out}$ performance. It also provides high $T_p$ and low $T_s$.

When the index of refraction of the light redirecting structure is relatively large (for example, n=1.88, 1.98), in the two-interface turning films $\beta_1 < \beta_2$ (see Table 3 of FIG. 13 and Table 4 of FIG. 14), the corresponding three-interface turning films cannot have $\beta_1=90°$.

Table 8 of FIG. 18 shows Examples 9.1-9.5 for n=1.88. In Example 9.1, $\beta_1=85°$ and $\beta_2=68.5°$. This film works acceptably for $\theta_{in}=63°$, and $\theta_{in}=70°$, and in terms of output angle $\theta_{out}$ performance. It also provides high $T_p$ and low $T_s$.

In Example 9.2, $\beta_1=85°$ and $\beta_2=70.0°$. This film works acceptably for principal angles $\theta_{in}=75°$, and $\theta_{in}=70°$, in terms of output angle $\theta_{out}$ performance. It also provides high $T_p$ and low $T_s$.

Example 9.3 and Example 9.4 are identical to Example 9.1 except that Example 9.3 has a larger $\beta_2(\beta_2=72.5°)$ and Example 9.4 has a smaller $\beta_2$ ($\beta_2=66.0°$). These embodiments do not work acceptably for principal angles $\theta_{in}=63°$, $\theta_{in}=70°$, or $\theta_{in}=75°$ in terms of output angle $\theta_{out}$ performance. In Example 9.5, $\beta_1=88.5°$ and $\beta_2=62.0°$. This film works acceptably for principal angles $\theta_{in}=75°$, and $\theta_{in}=70°$ in terms of output angle $\theta_{out}$ performance. It also provides high $T_p(\sim 92.4\%)$ and low $T_s(\sim 32.6\%)$. The contrast $T_p/T_s$ is almost 3:1. This is possible because $\theta_{in}-\theta_b$ decreases with refractive index n and $\theta_7-\theta_b$ can be tuned to be slightly greater than zero.

Table 9 of FIG. 19 shows Examples 10.1- 10.4 for n=1.98. $\beta_2=63.2°$ in all examples. In Example 10.1, $\beta_1=85.5°$. This film works acceptably for principal angles $\theta_{in}=63°$, and $\theta_{in}=70°$, and in terms of output angle $\theta_{out}$ performance. It also provides high $T_p$ and low $T_s$. In Example 10.2, $\beta_1=86°$. This film works acceptably for $\theta_{in}=75°$, and $\theta_{in}=70°$, in terms of output angle $\theta_{out}$ performance. It also provides high $T_p$ and low $T_s$. In Example 10.3, $\beta_1=87°$) and in Example 10.4 $\beta_1=84°$. These last two examples do not work acceptably for principal angles $\theta_{in}=63°$, $\theta_{in}=70°$, or $\theta_{in}=75°$ in terms of output angle $\theta_{out}$ performance. When n is too large, for example n=2.38, no suitable film designs are found to offer acceptable output angle $\theta_{out}$ performance and provide high $T_p$ and low $T_s$.

As the examples of Tables 1-9 in FIGS. 11-19 show, it is possible to obtain suitable values of $\theta_{out}$, $T_p$, $T_s$, over a range of input principal angles $\theta_{in}$ and indices of refraction n, given suitable base angles $\beta_1$ and $\beta_2$. However, several design and material parameters for turning film 20 must be within the correct range in order to provide both suitable turning film performance and improved polarization of the illumination.

As has been shown (Table 1 in FIG. 11), some earlier solutions may have inadvertently provided some small, incidental improvement in polarization, using the effects described in the Arai '220 disclosure. However, any such gains with conventional approaches were minimal and are inherent to any type of turning film, at least to some degree. The apparatus and method of the present invention, on the other hand, optimize the design geometry and material construction of turning film 20 in order to take advantage of Brewster's angle effects at both incident and exit interfaces. In this way, both near-normal (or, more generally, near target) angular redirection and improved polarization state can be obtained from a single light redirection article in a backlight illumination system. Unlike earlier turning film designs that may have incidentally provided some measure of polarization improvement for incident light at one specific principal angle, the apparatus of the present invention can both redirect light and improve polarization over a broader range of principal angles. As exemplary embodiments have shown, the turning film design of the present invention can be optimized to improve polarization and provide suitable light redirection for light at principal angles that differ by as much as 5 degrees or more. It is particularly useful for incident illumination at either of at least two different principal angles, each principal angle being greater than 60 degrees from normal and said principal angles having a difference of 5 degrees or greater. It is also particularly useful for incident illumination at each of at least three different principal angles, each principal angle being greater than 60 degrees from normal and said angles having a difference of 5 degrees or greater from each other. In one embodiment the principal angles are 63 degrees, 70 degrees and 75 degrees.

In one embodiment of the invention the output light for both principal angles has a transmittance of one polarization in excess of 85 percent, and preferably has a transmittance of one polarization in excess of 90 percent. In another embodiment the output light for both principal angles has a transmittance of less than 55 percent for the orthogonal polarization, and preferably the output light for both principal angles has a transmittance of less than 50 percent for the orthogonal polarization. Preferably the output light for both principal angles has a transmittance of one polarization in excess of 85 percent and the output light for both principal angles has a transmittance of less than 55 percent for the orthogonal (or opposite) polarization. More preferably the output light for both principal angles has a transmittance of one polarization in excess of 90 percent and the output light for both principal angles has a transmittance of less than 50 percent for the orthogonal (or opposite) polarization.

In one preferred embodiment the light redirecting article for incident illumination wherein the principal angle is 70 degrees or less, said illumination is directed at an incident angle within +/−11 degrees of Brewster's angle at the input surface and said light is incident at the exit surface at an angle that is within +/−11 degrees of Brewster's angle at the exit surface. In another embodiment the light redirecting article for incident illumination wherein the principal angle is 70 degrees or more, said illumination is directed at an incident angle within +/−16 degrees of Brewster's angle at the input surface and said light is incident at the exit surface at an incident angle that is within +/−16 degrees of the Brewster's angle at the exit surface.

Thus, the present invention provides a low cost turning film solution that provides polarized illumination using a reduced number of components.

The invention has been described in detail with particular reference to certain preferred embodiments thereof, but it will be understood that variations and modifications can be effected within the spirit and scope of the invention.

| PARTS LIST | |
|---|---|
| 1, 2, 3, 4. | Area |
| 10. | Light guiding plate |
| 12. | Light source |
| 14. | End surface |
| 16. | Output surface |
| 18. | Input surface |
| 20. | Turning film |
| 22. | Flat surface |
| 24, 24'. | Near surface |
| 26, 26'. | Far surface |
| 28. | Substrate |
| 29. | Truncated surface |
| 31, 32, 33, 35. | Rays |
| 34. | Light redirecting structure |
| 41, 42, 43, 45. | Rays |
| 52. | Reflective surface |
| 60. | Display apparatus |
| 70. | LC spatial light modulator |
| 72. | Rear polarizer |
| 73. | Front Polarizer |
| 75. | Light redirecting structure |
| 80. | half wave plate |
| 82. | Point light source |
| 100. | Display apparatus |
| 120. | Light gating device |
| 122. | Turning film |
| 124. | Polarizer |
| 125. | Reflective polarizer |
| 142. | Reflective surface |
| 172, 173. | Transmission axes |
| α. | Apex angle |
| β1. | base angle |
| β2. | base angle |
| γ. | groove angle |
| n. | Refractive index |
| $\theta_{in1}$. | Incident angle for a first light guide plate |
| $\theta_{in2}'$. | Incident angle for a second light guide plate |
| $\theta_{out}$. | Output angle |
| θ2. | Refracted angle at the flat surface |
| θ3. | Incident angle at the far surface |
| θ4. | Refracted angle at the far surface |
| θ5. | Reflected angle at the far surface |
| θ6. | Incident angle at the near surface |
| θ7. | Refracted angle at the near surface |
| V. | Film normal direction |
| V1. | Normal direction on the far surface |
| V2. | Normal direction on the near surface |
| H. | Horizontal direction |
| R1. | Central illumination ray |

The invention claimed is:

1. A light redirecting article for redirecting light toward a target angle, the light redirecting article comprising a material having a refractive index greater than 1.6, said light redirecting article further comprising: (a) an input surface for accepting incident illumination over a range of incident angles; (b) an output surface comprising a plurality of light redirecting structures each light redirecting structure having a near surface and an exit surface for emitting an output light at an emitted light angle, wherein the exit surface is at an oblique angle relative to the plane of the input surface, whereby for incident illumination at either of at least two different principal angles, each principal angle being greater than 60 degrees from normal and said principal angles having a difference of 5 degrees or greater, the emitted light angle is within 5 degrees of the target angle.

2. The light redirecting article of claim 1 wherein the output light for both principal angles further has a transmittance of one polarization in excess of 85 percent.

3. The light redirecting article of claim 1 wherein the output light for both principal angles further has a transmittance of one polarization in excess of 90 percent 4. The light redirecting article of claim 2 wherein the output light for both principal angles has a transmittance of less than 55 percent for the orthogonal polarization.

5. The light redirecting article of claim 2 wherein the output light for both principal angles has a transmittance of less than 50 percent for the orthogonal polarization.

6. The light redirecting article of claim 1 wherein for incident illumination at each of at least three different principal angles, each principal angle being greater than 60 degrees from normal and said angles having a difference of 5 degrees or greater from each other, the emitted light angle is within 5 degrees of the target angle.

7. The light redirecting article of claim 1 wherein the target angle is normal with respect to the plane of the light redirecting article.

* * * * *